April 14, 1953 J. H. HOMRIGHOUS 2,635,233

MULTIPLEX RADIOPHONE COMMUNICATION SYSTEM

Original Filed July 8, 1946 14 Sheets-Sheet 1

INVENTOR.

John H. Homrighous

INVENTOR.
John H. Homrighous

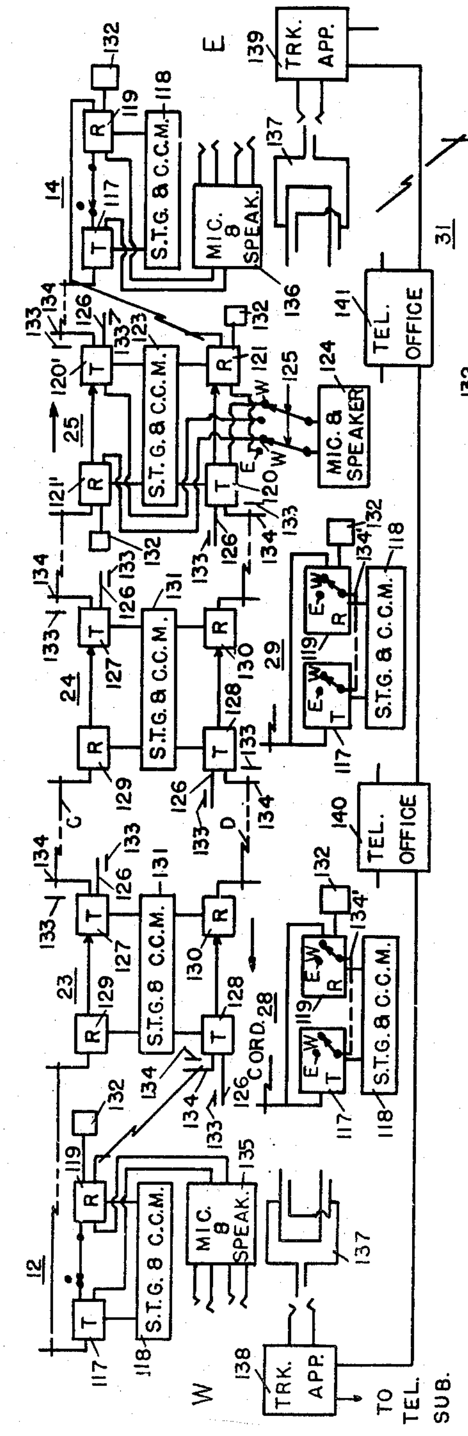
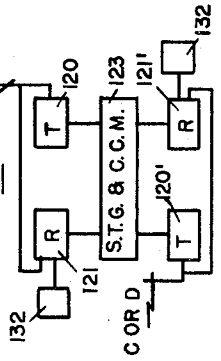
FIG 8
| | | | | | | | | | |
|---|---|---|---|---|---|---|---|---|---|
| 12 | 28 | 29 | 30 | 31 | | | 24 | 25 | 14 |
| F1 | F2 | F3 | F4 | F5 | | | | | |
| 28P | 12 | 23 | 24 | 25 | | | | 14 | |
| 28A | 1 | 2 | 3 | 4 | 5 | 6 | 7 | 8 | 9 |
| 29P | 12 | 23 | 24 | | | | | | |
| 29A | | | | | | | | | |
| 31P | | | | | | | | | |
| 31A | | | 145 | 143 | 144 | 146 | | | |
| 28 | 29 | 31 | | | | | | | |
FIG 9
| | | | | | | | | | |
|---|---|---|---|---|---|---|---|---|---|
| 28P | 1 | 2 | 3 | 4 | 5 | 6 | 7 | 8 | 9 |
| 10 | 11 | 12 | 13 | 14 | 15 | 16 | 17 | 18 | 19 |
FIG 10
INVENTOR.
John H. Homrighous

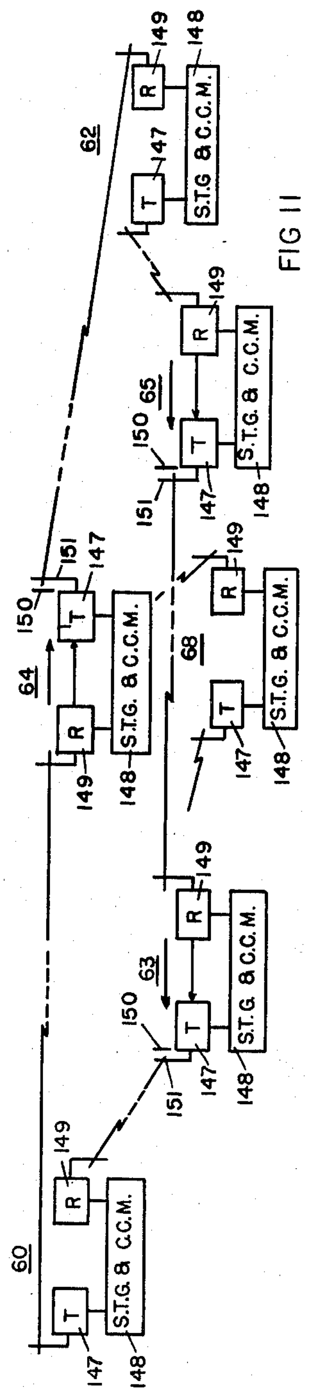
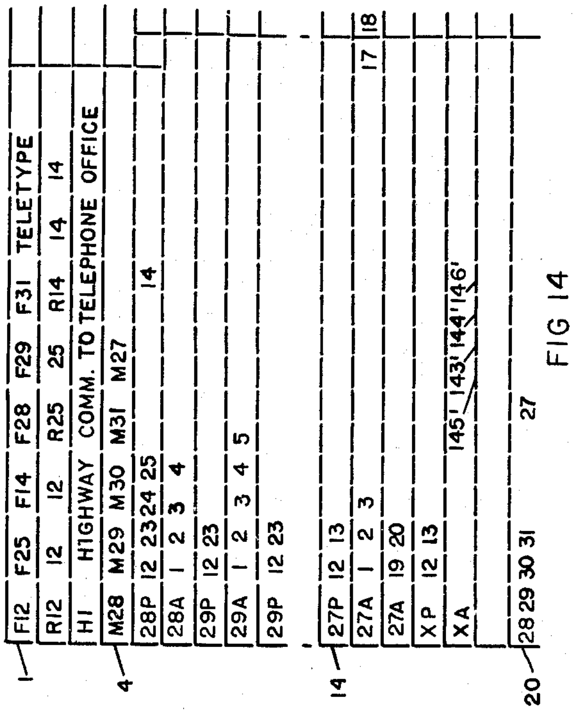
FIG 14
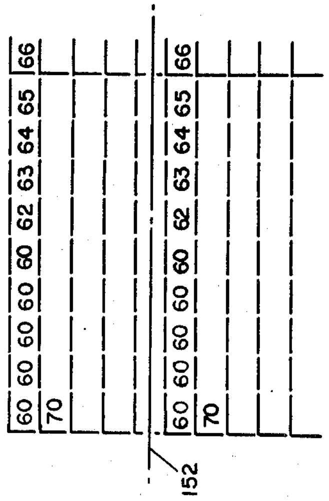
FIG 12
INVENTOR.
John H. Homrighous

INVENTOR.

John H. Homrighous

INVENTOR.

John H. Homrighous

INVENTOR.
John H. Homrighous

MULTIPLEX RADIOPHONE COMMUNICATION SYSTEM

Original Filed July 8, 1946 14 Sheets-Sheet 8

INVENTOR.
John H. Homrighous

INVENTOR.
John H. Homrighous

April 14, 1953 J. H. HOMRIGHOUS 2,635,233

MULTIPLEX RADIOPHONE COMMUNICATION SYSTEM

Original Filed July 8, 1946 14 Sheets-Sheet 10

INVENTOR.

John H. Homrighous

INVENTOR.

INVENTOR.
John H. Homrighous

INVENTOR.
John H. Homrighous

INVENTOR.
John H. Homrighous

Patented Apr. 14, 1953 2,635,233

UNITED STATES PATENT OFFICE 2,635,233

MULTIPLEX RADIOPHONE COMMUNICATION SYSTEM

John H. Homrighous, Oak Park, Ill.

Original application July 8, 1946, Serial No. 681,857. Divided and this application May 16, 1949, Serial No. 93,613

16 Claims. (Cl. 343—204)

This application is a division of application Serial No. 681,857 filed July 8, 1946.

This invention relates to a multiplex radio communication system and more particularly to a system for communication between mobile radio stations, and between mobile and fixed stations.

One of the main objects of my invention is to provide radio automatic relay or booster stations for extending a call over great geographical distances or beyond the horizon from a calling station.

Another object of my invention is to provide means for routing a call automatically through one or more fixed radio relay stations to a distant mobile radio station.

Another object of my invention is to provide means for routing a call automatically from a mobile radio station through one or more relay stations to any desired fixed radio station.

Another object is to provide means for routing a call automatically from a mobile radio station through one or more relay stations to any other mobile station.

Another object of the instant invention is to transmit like signals from all stations along a predetermined route simultaneously so that a mobile unit traveling the route may be in continuous communication with other mobile units or any fixed station.

Another object of my invention is to provide improved means whereby a plurality of messages or two-way conversations may be transmitted intermittently over a single transmission lane or carrier waves of the same frequencies.

Another object of my invention is to provide means in a radio communication system whereby any station may individually signal or call any mobile station regardless of the location of the mobile station along its predetermined route.

Another object of my invention is to provide means whereby the relative position of a mobile radio station along a predetermined route may be indicated at the mobile radio station.

Another object is the provision of means in a mobile station to indicate the relative location of all mobile craft traveling a predetermined route.

Another object of my invention is to provide means for indicating in the fixed radio stations at either terminal of an airway or mobile route or at fixed wayside stations the relative location or position and movement of mobile radio stations along the predetermined route.

Another object of my invention is to provide in a radio communication system means in the mobile and fixed radio stations to indicate when a communication channel is in use.

Another object of this invention is to transmit signals from a radio station in an airplane to fixed terminal radio stations and other radio stations in different airplanes to indicate the altitude that the first airplane is flying.

Another object of my invention is to provide in a radio communication system means to transmit signals from fixed radio stations along a predetermined route to operate "on course" devices in the airplanes flying the route for indicating whether the airplane is on route.

Another object of my invention is to provide in a mobile radio communication system means at the fixed radio stations at either end of a predetermined route for transmitting the name of the city that the fixed station is located in or the name of the city that the airplane is flying toward so that a pilot flying the route may as desired listen to the route identification.

Another object is to provide improved means for routing a call from a mobile radio station through one or more fixed radio stations to a distant telephone office.

Another object is to provide means in an aircraft radio station for detecting received obstacle signals modulated on carrier waves of the same frequencies from a number of transmitters on top of buildings or mountains to thereafter determine the direction of any one of the transmitting stations relative the aircraft.

Message in this specification is to be understood to include any intelligence or any portion of any intelligence represented by sound, facsimile, code, or position indicating signals.

A channel in this specification is to be understood as a one way path for the transmission of electrical signals between distant stations, or a path for the transmission of signals during recurring periods of time, and may be one of a number of carrier wave channels in a transmission path or lane for the transmission of signals representative of any intelligence and or control signals.

Messages may be transmitted through the common transmission path or lane in recurring periods. The preassigned periods of time for separate messages remain fixed regardless of the number of messages being intermittently transmitted.

Mobile stations referred to in this specification are to be understood as the radio transmitter and receiver stations located in an airplane, train, truck, bus, taxicab, boat, tank or any other vehicle.

The multiplex radiophone communication system of the instant invention is applicable to many communication services by wireless transmission such as may be required for the operation of railroads, buses, trucks, taxicabs, airplanes, etc.

The radio transmitting and receiving stations are arranged to transmit message signals intermittently, or stated in another way, a message from one station may be transmitted intermittently during certain recurring periods of time, and a message from a second radio station may be transmitted during different recurring periods. No two signal originating stations in the same group may transmit signals during the same period of time. Likewise the receivers in each station may be arranged to receive signals only during certain predetermined periods.

The radio system shown and described herein is primarily for communication between fixed radio stations and mobile radio stations and comprises a plurality of fixed radio stations along a highway, railroad tracks, or an airplane route. The fixed radio stations may be spaced at certain distances along the conveyance route with terminal or transmitting and receiving stations at either end of the route. The intermediate radio relay stations may be used for relaying or retransmitting the signals to another relay or terminal station.

The communication systems described herein are intended for the transmission of message signals and the transmission of control signals for actuating mobile positions indicating devices, including altitude indicating devices and "on course" signals.

Mobile radio stations may be located in automobiles, trucks, buses, engine cabs, cabooses, airplanes or any other mobile vehicle. These mobile transmitter and receiver stations may through the radio relay stations communicate by speech, signaling or both with a fixed terminal station while traveling along a predetermined route.

Carrier waves of the same length may be employed for transmission of messages in both directions or carrier waves of the same length may be employed for communication west to east and other carriers of a different wave length may be employed for communication east to west.

This invention is an improvement over my prior patent, Number 2,369,783, issued February 20, 1945, which describes a television system for selecting a radio station by varying the transmitted signals, and also is an improvement over my prior applications. Serial No. 472,105, filed January 12, 1943, Patent 2,437,027, granted March 2, 1948, describes a communication system for the transmission and reception of several one way messages over a single channel, also application Serial No. 558,931, filed October 16, 1944, now Patent No. 2,532,719, granted December 12, 1950, describes a radio multiplex system whereby any station in a large group of stations including mobile stations may signal individually any other station in the group.

The synchronizing system employed for controlling the saw tooth generators may be an improvement over the method shown and described in my copending application Serial No. 476,897, filed February 24, 1943, now Patent No. 2,524,347, granted October 3, 1950, and Patent 2,398,641, issued April 16, 1946.

In the instant invention I may employ high or ultrahigh frequency carrier, frequency modulated; however, it is to be understood that the principles involved may be equally applicable to microwaves, and amplitude modulation may be utilized when desirable.

Other objects and advantages of my invention will appear from the following description taken in connection with the accompanying drawings in which:

Figures 4, 7, 9, 10, 12 and 14 are diagrammatic illustrations of numbering schemes for mobile multiplex radio communication systems.

Figures 6, 8 and 11 are diagrammatic illustrations of radio systems with signaling paths between stations for certain sections of the communication systems shown in Figures 1, 2 and 3.

Figures 1, 2, 3:
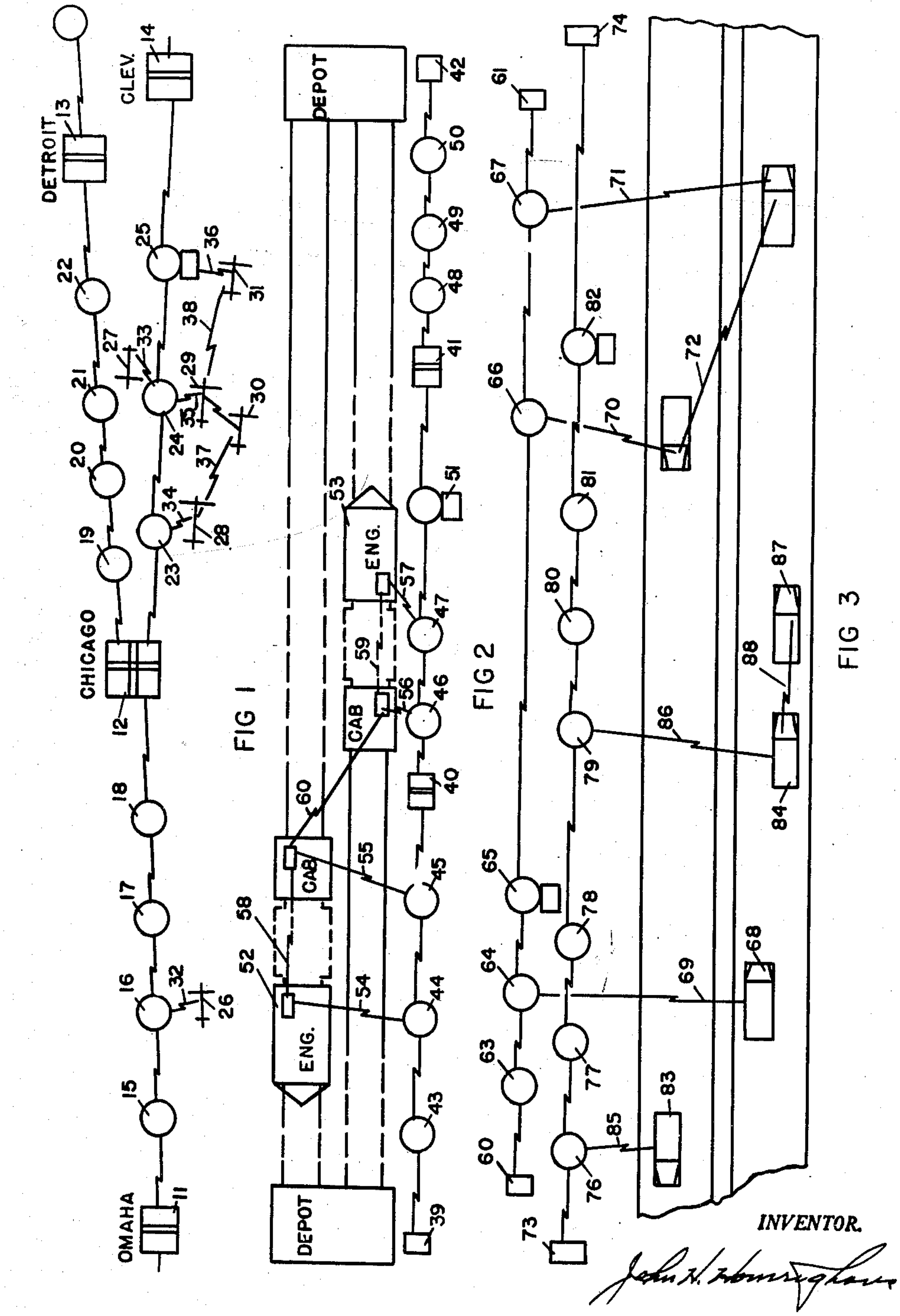
Figures 1, 2 and 3 are diagrammatic illustrations of radio communication systems for airplanes, railroads, and highway vehicles, respectively.

Figure 1 illustrates a radio communication system for several airplane routes comprising a terminal station in each large city and a number of radio relay stations spaced along the route. One or two transmission lanes or paths may be employed between terminal stations for two-way messages between the terminal stations and between either terminal station and the mobile stations in the aircraft proceeding along the airways. Carrier waves of the same length or of different length may be utilized for the transmission in either or both directions through the relay stations. Signals may be initiated in the mobile stations for sound communication and for actuating in each terminal station airplane position indicating and altitude indicating devices.

Figure 2 illustrates a radio communication system for railroads. This system may be similar to that described above for aircraft.

Figure 3 illustrates two separate communication systems along a highway, one for buses and another one for trucks. Other systems may be employed along the same route for communication with taxicabs, etc. Each of these systems may employ one or two transmission lanes, with two transmission lanes one would be used to transmit in one direction and the other lane or path would be used to transmit signals in the opposite directions. Furthermore, highway vehicle services probably would only be for the transmission of sound communication signals; however, if desired mobile position indicating devices may be employed.

Figure 4:
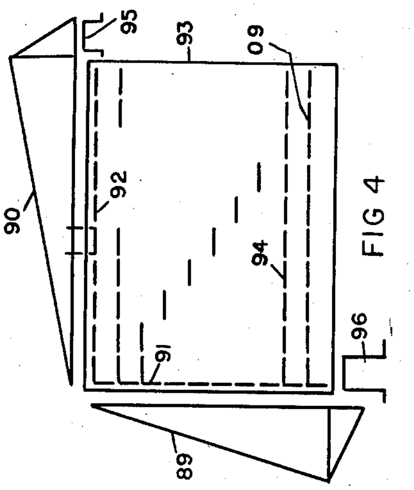

Figure 4 illustrates an arrangement or period of time frame for assigning and associating two digit numbers to a group of stations. This arrangement utilizes two saw tooth or timing waves; each wave may have ten frame divisions or parts. The waves are shown at right angles to each other to form a period of time or station number assignment frame. The horizontal waves may be ten times the frequency of the vertical waves so that the combination of the ten horizontal divisions and ten vertical divisions will give one hundred separate areas, or one hundred stations numbers. Smaller groups may be obtained by using only the horizontal saw tooth wave as described in my prior application Serial No. 558,931, and fewer divisions of each wave may also be employed. Fifteen or twenty lines may also be employed in each frame.

While I have shown a system employing ten horizontal lines per frame, it is to be understood that there may be many horizontal lines for each horizontal portion or division of the frame.

Figure 5:
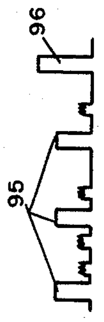
Figure 5 is a diagrammatic illustration of the control signals.

Figure 5 illustrates diagrammatically the horizontal or line, and the vertical or frame control signal for a group of stations as illustrated in Figure 4.

Figure 6:
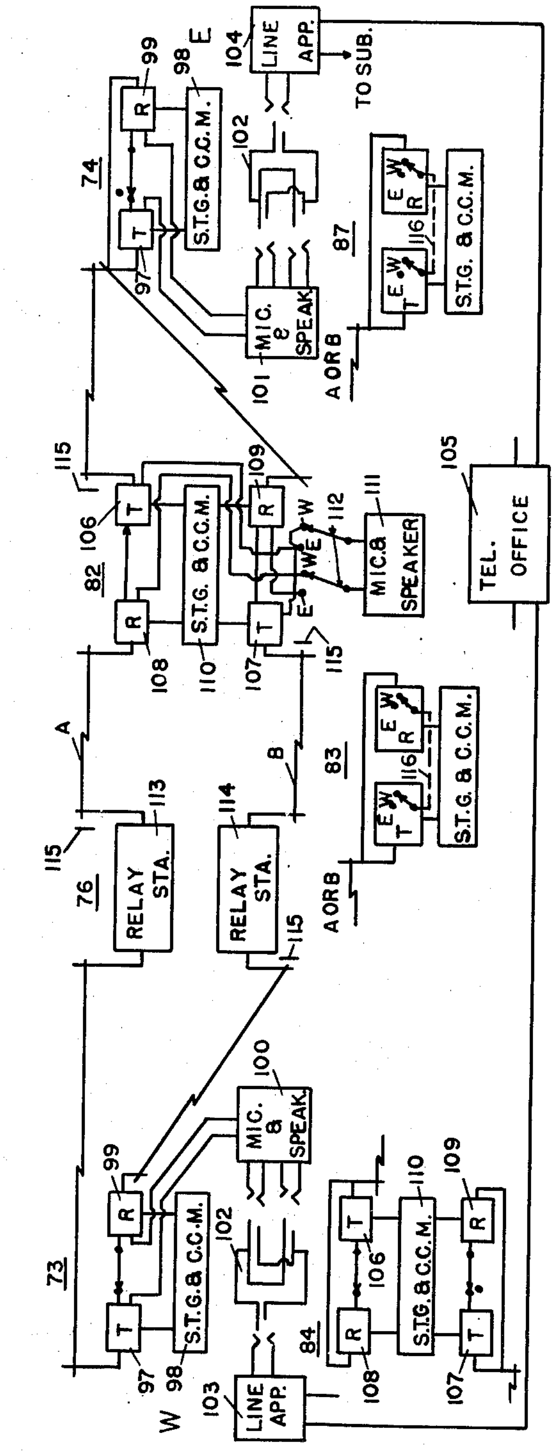

Figure 6 shows a plurality of radio stations along a conveyance route comprising a terminal or main station at either terminal of the route, a radio relay station and a wayside station intermediate the terminal stations, also three mobile radio stations are shown. This communication system may employ two carrier wave frequencies or two transmission lanes, one for transmitting signals from the east terminal toward the west terminal, and another carrier wave for transmitting signals from the west terminal toward the east terminal. One way communication may be over telephone trunks as illustrated. The transmitting antennas in the relay and wayside stations may have reflectors to shield the associated receiving antenna at the same station from signals radiated by the transmitting antenna. The radio relay stations in Figure 6 retransmit signals received from other stations. The mobile stations do not retransmit received signals.

Figure 7:
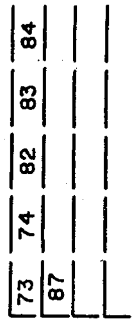

Figure 7 shows a station numbering arrangement or station number assignment frame having longer periods than those in Figure 4 for the intermittent transmission of signals.

Figure 8 shows a radio communication system applicable to aircraft routes and other conveyance routes where it is desired to show in the terminal stations the relative locations of mobile equipment along the route and with airplanes the altitude at which each plane is flying. This system comprises a plurality of spaced radio stations along the route and a terminal station at both terminals of the route, and radio relay and a wayside station intermediate the terminal stations. The relay and wayside stations not only retransmit received signals but must produce signals in certain assigned periods under the control of mobile radio stations on the route, whereby, the relay stations or their control mobile station may be identified or shown on the position indicator at the terminal stations. Several mobile stations are shown, none of which retransmits received signals. This system employs two carrier frequencies, one for signals directed to the west terminal and a second carrier frequency for signals directed toward the east. The transmitting antennas in the relay and wayside stations may have reflectors to prevent effective radiation back toward its associated receiving antenna. One mobile station is shown with double transmitters and receivers to permit signaling in both directions simultaneously.

Figure 9 shows a station numbering scheme including mobile position indicating number arrangement and altitude indicating number arrangement for use in the communication system shown in Figure 8.

Figure 10 shows a modification of Figure 9 consisting of a larger group of mobile position indicating numbers to correspond to a greater number of radio relay stations on a particular route.

Figure 11 shows another radio communication system utilizing only one carrier wave frequency for two way transmission between a terminal station and mobile stations. In this system, if desired the terminal station may be provided with mobile position indicating devices similar to those in Figure 8. The terminal station may have considerable more power than the relay or mobile stations, necessitating more relay stations for the return channels.

Figure 12 shows a station numbering scheme for use in the communication system shown in Figure 11. The upper part of the number assignment frame represents station numbers for signal transmission toward the east while the lower part of the frame represents station numbers for signal transmission westward.

Figures 13, 18:
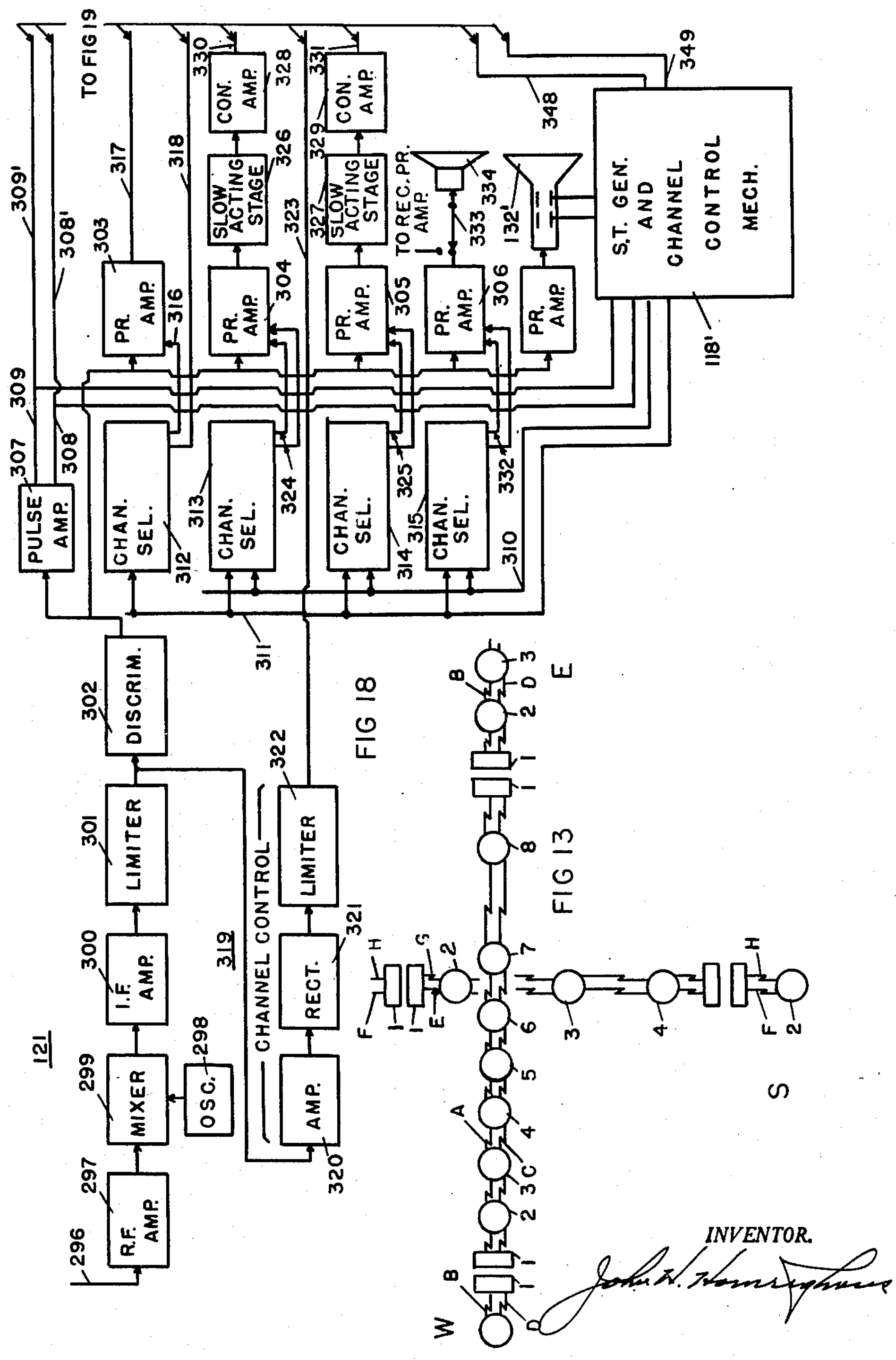
Figure 13 shows an arrangement of radio stations along different routes.
Figures 18 and 19 are detail views of the receiver and the transmitter respectively employed in the relay and wayside stations in Figures 6, 8 and 11.

Figure 13 shows diagrammatically an arrangement of radio stations along routes running west to east and north to south so that the station numbers shown in the position indicating devices are successively higher as the plane or mobile station moves toward the east or south.

Figure 14 is a typical period of time frame showing a channel numbering scheme for a number of different types of services for mobile and fixed radio communication stations, where much larger capacity is required to accommodate a large number of relay stations along a conveyance route. This frame also shows periods of time for transmitting facsimile signals for a number of mobile and fixed stations, other periods for telephone messages and on course signals, to be explained later.

Figure 15:
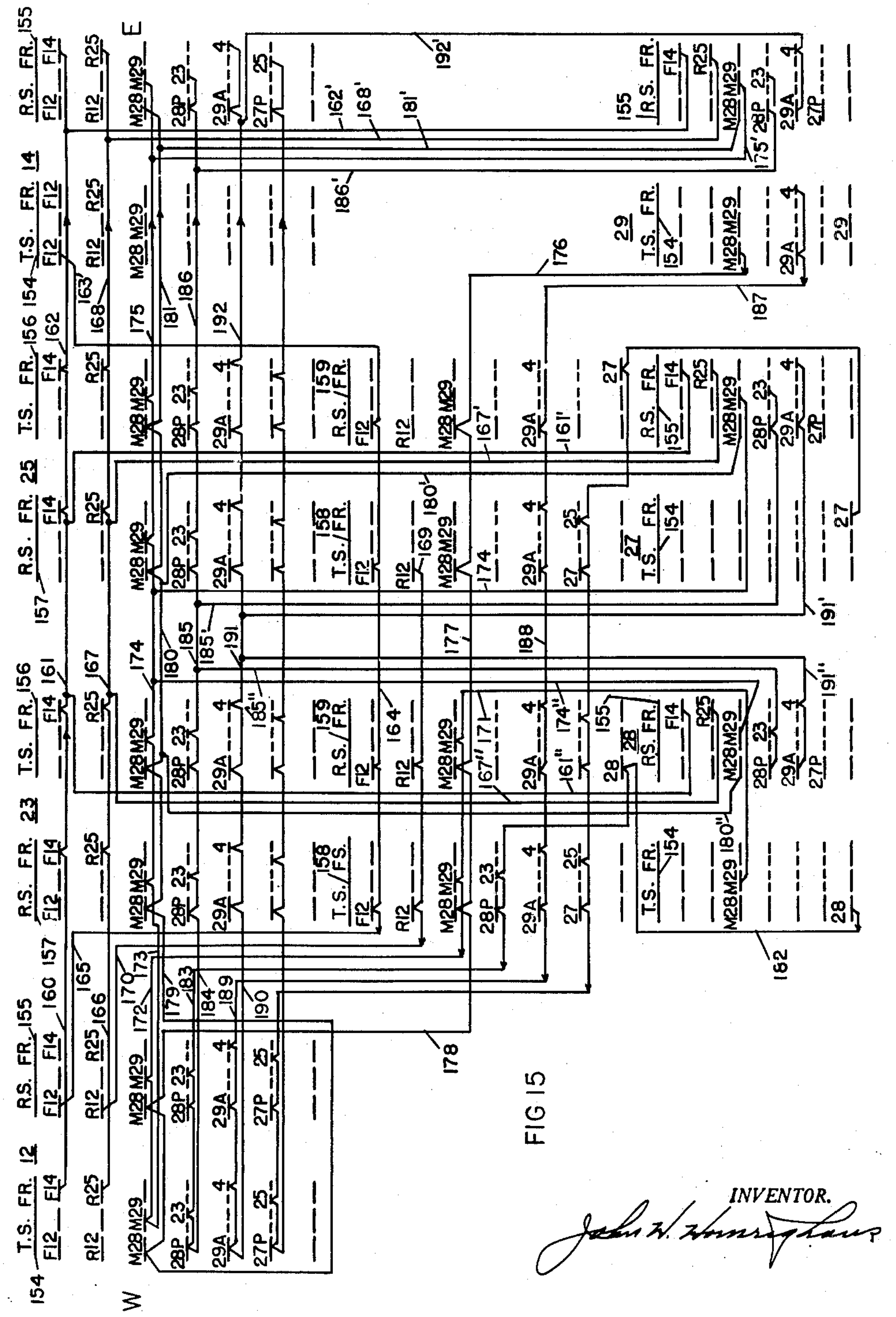
Figure 15 shows a typical schematic channel arrangement between a number of stations.

Figure 15 illustrates partial channel selector frames for a number of fixed stations and several mobile stations, with lines indicating certain channel paths between stations for the transmission of different messages in periodic rotation from a number of stations over carrier waves of the same length.

Figure 16:
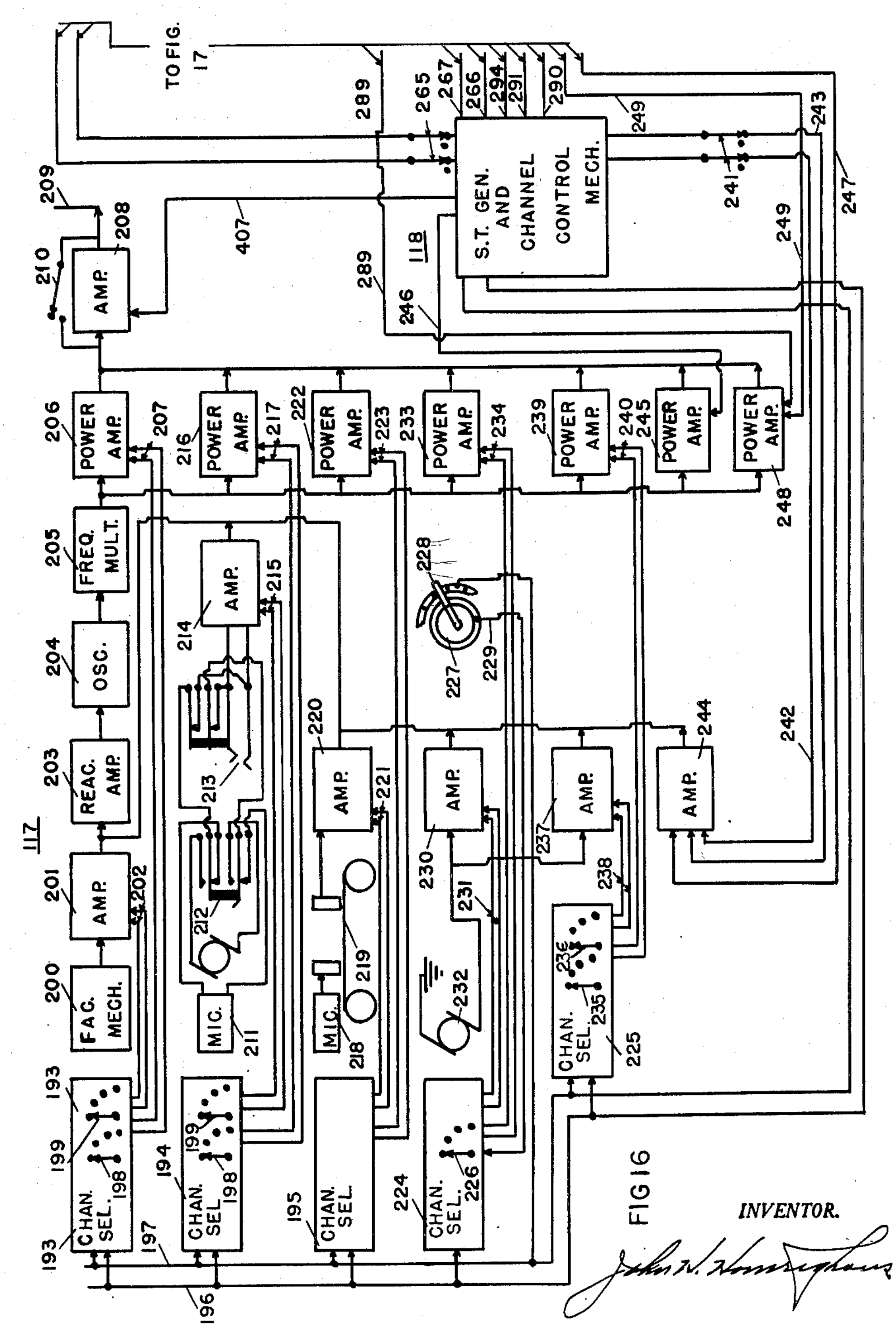
Figure 16 and 17 are detail views of the transmitter and the receiver respectively employed in the terminal and mobile stations shown in Figures 6, 8 and 11.

Figure 16 shows a block diagram for a transmitter in a transmitter receiver station that may be used in any of the terminal or mobile stations shown in Figures 6, 8 and 11. This transmitter comprises a number of selectors for selecting the proper timing impulses to control the intermittent transmission of signals for a number of different services such as facsimile messages, sound messages, operating position indicating and altitude indicating mechanisms.

Figure 17:
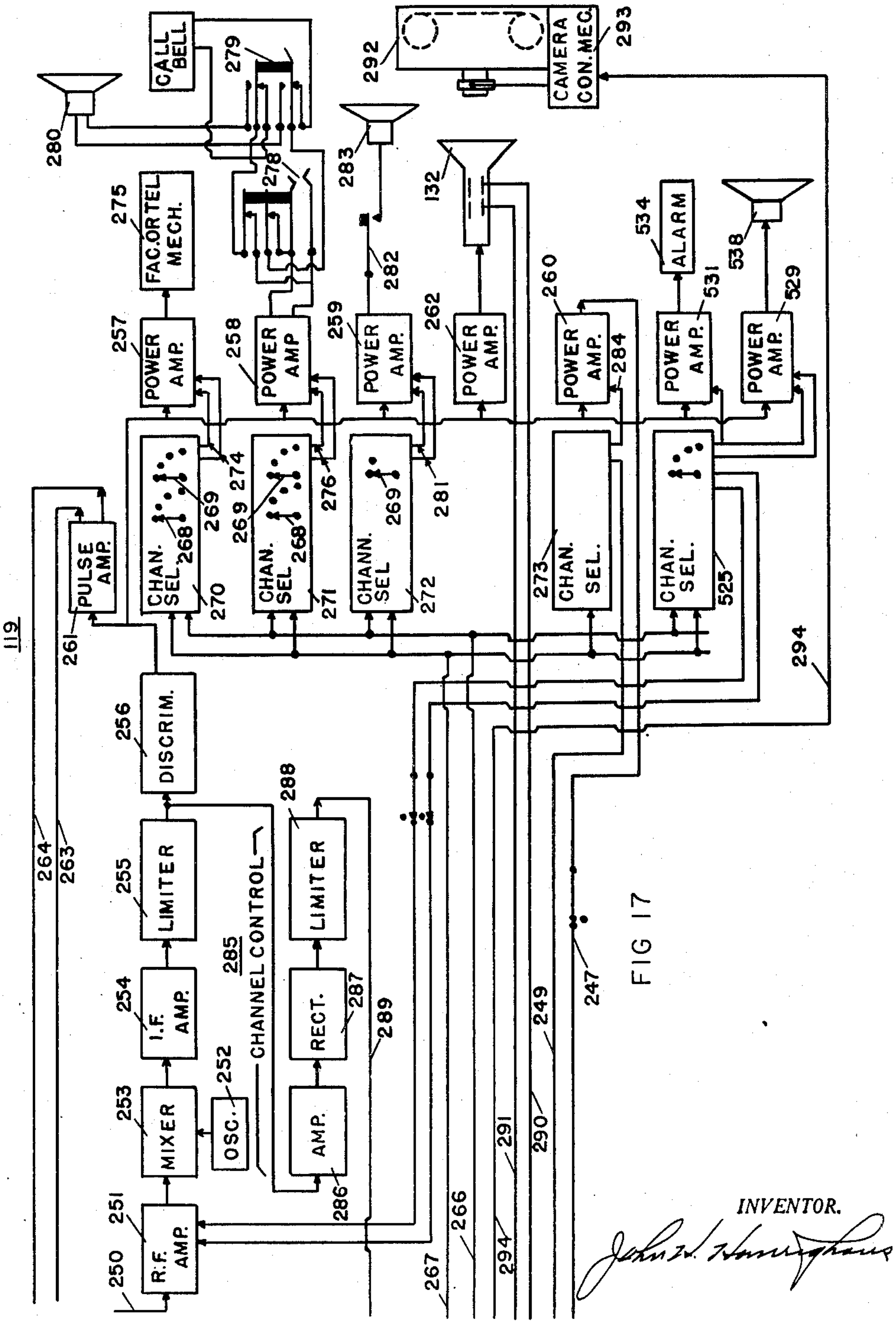

Figure 17 shows a block diagram for a receiver associated with the transmitter of Figure 16. This receiver comprises a number of selectors for selecting the proper timing impulses or signals to control the intermittent reception of signals for a number of different services.

Figure 18 shows a block diagram for a receiver in a relay or booster station that may be used in any of the relay or wayside stations shown in Figures 6, 8 and 11. This receiver comprises a number of selectors for selecting recurring periods under control of timing impulses for the reception of intermittent signals for several classes of services that are originated at other stations in the system.

Figure 19:
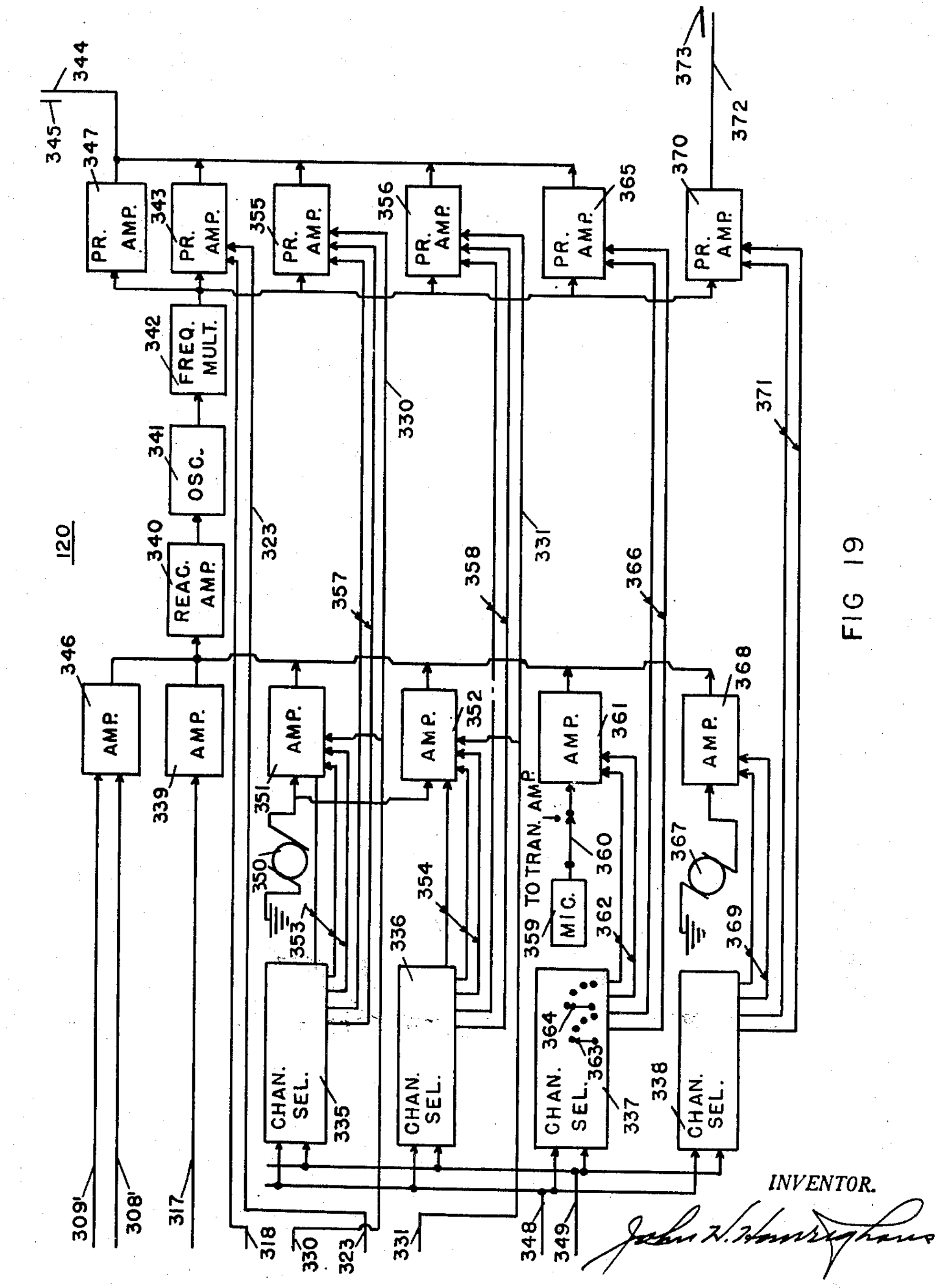

Figure 19 shows a block diagram for the transmitter associated with the receiver in Figure 18. This transmitter comprises a number of selectors for selecting the proper recurring periods for retransmitting the signals supplied from the receiver of Figure 18. This transmitter when used in a relay station along an airplane route may transmit from a separate antenna "on course" signals to inform pilots when they are flying on the right side of the route.

Figure 20:
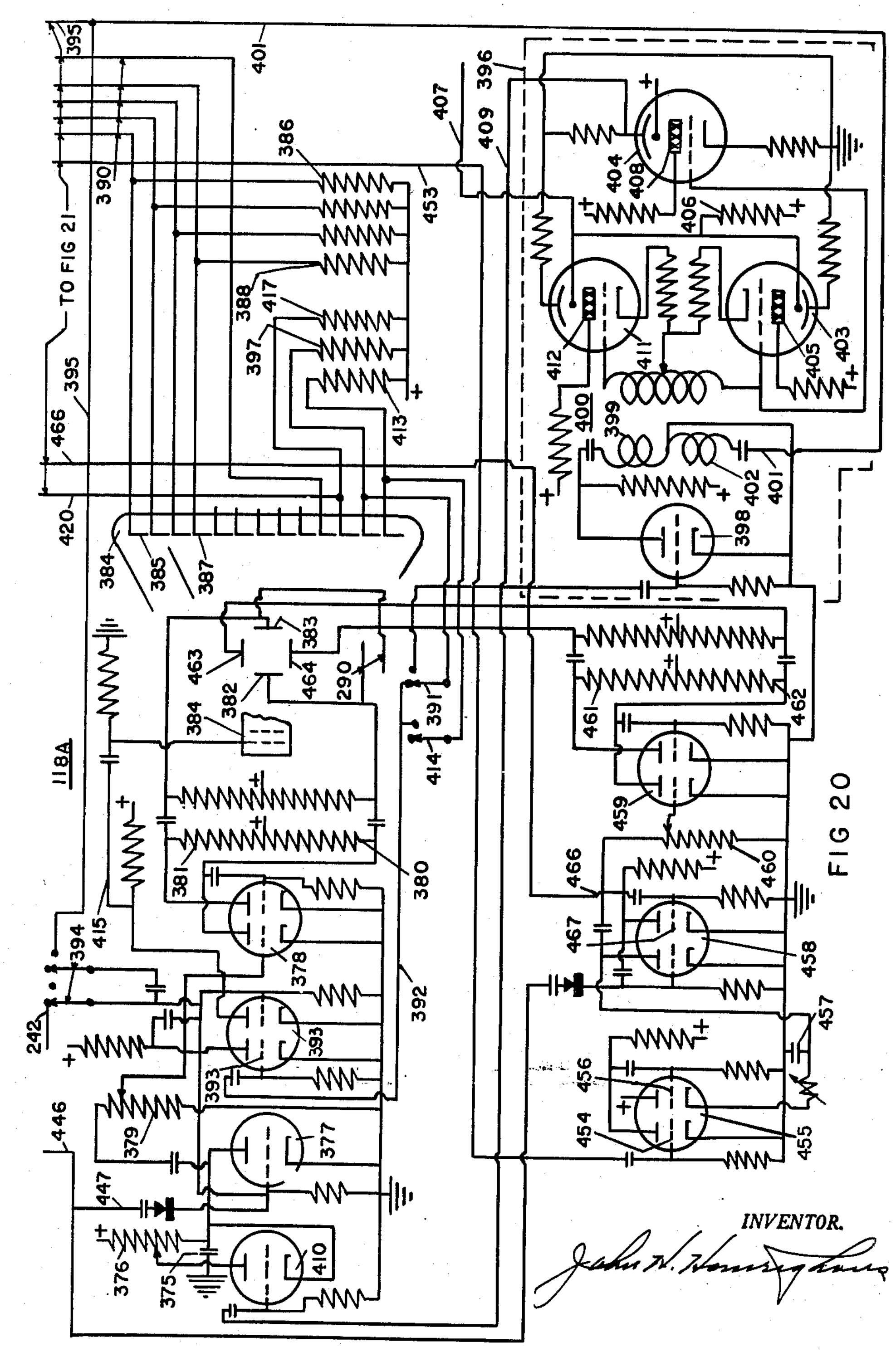
Figures 20 and 21 are circuit diagrams showing the saw tooth generators and channel control mechanism for transmitter receiver stations.
Figures 21, 23:
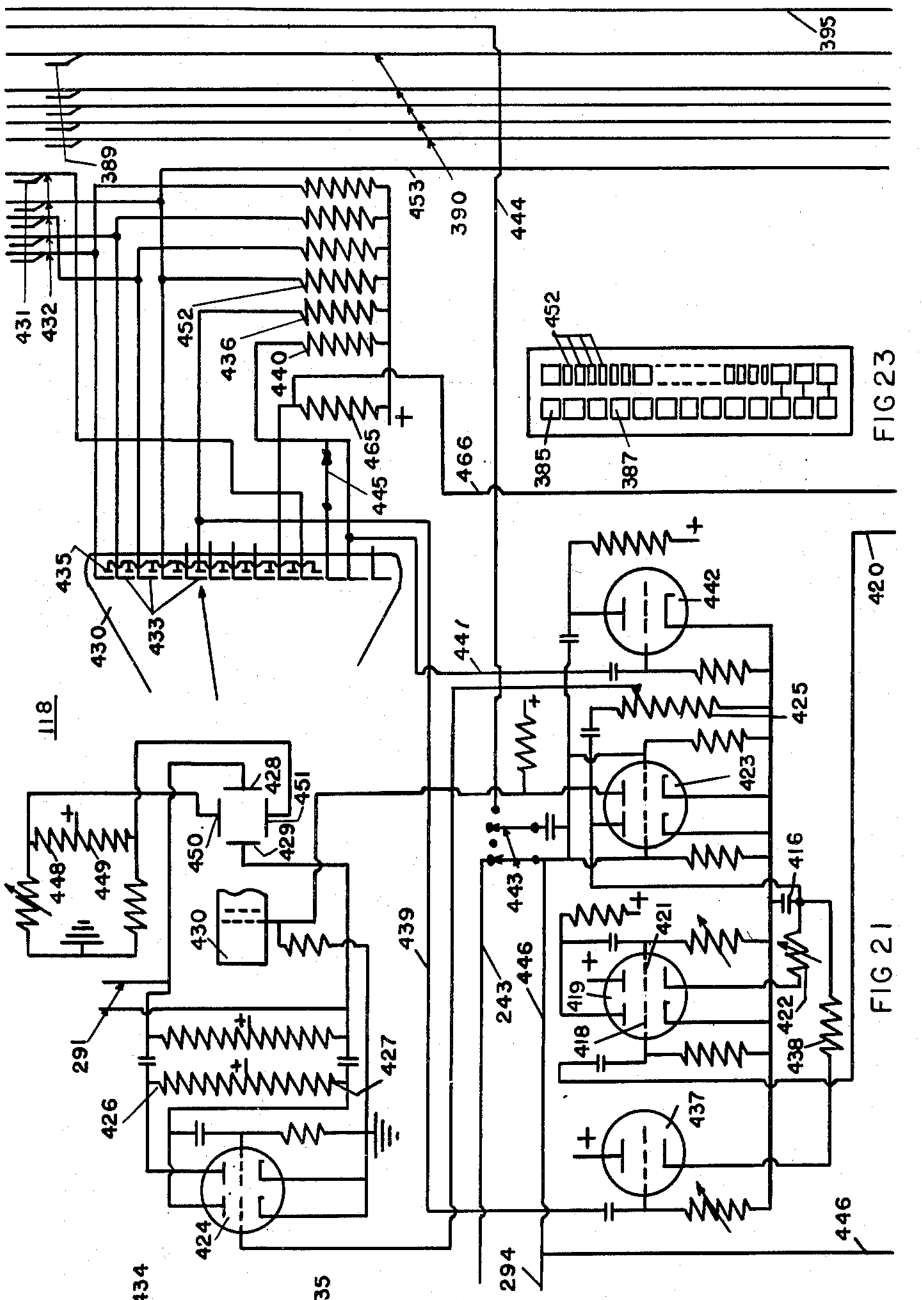
Figures 22 and 23 show details of the timing switches.

Figures 20 and 21 show apparatus and associated circuits to produce two series of saw tooth timing waves to control the tens and units pulse generators or electronic timing switches. These switches may produce two series of timing impulses which may be employed by the several channel selectors in each station to control channel selection.

Figure 22:
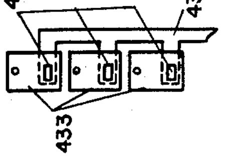

Figure 22 shows a detail view of the electrodes for the units timing switch.

Figure 23 shows a modified arrangement of the electrodes for the timing switch.

Figure 24:
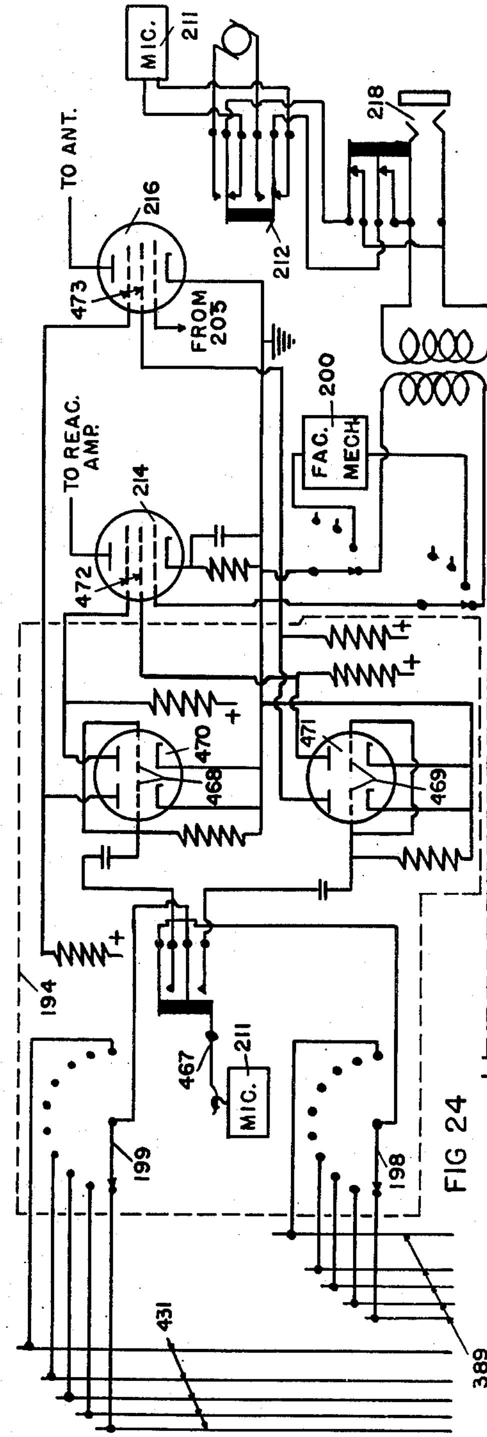
Figures 24, 25, 27, 28, 29 and 30 are detail circuit diagrams showing channel or period of time selectors employed in the several radio stations.
Figure 25:
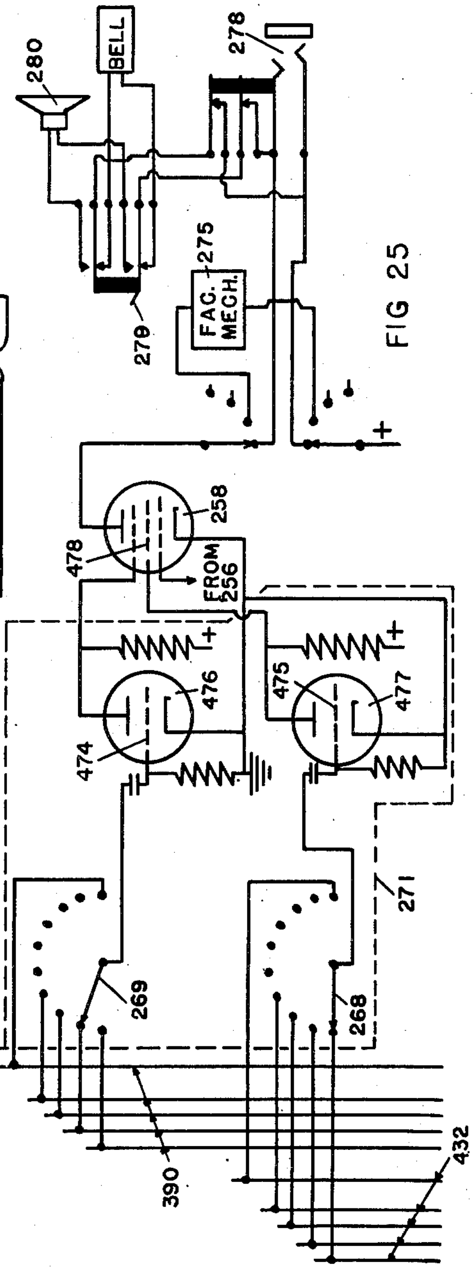

Figures 24 and 25 show apparatus and associated circuits for transmitter and receiver selectors respectively to select any one of a number of periods in successive saw tooth timing waves for the transmission of signals representative of different messages such as facsimile, sound, the name of city on route and mobile position control signals.

Figures 26, 28, 29:
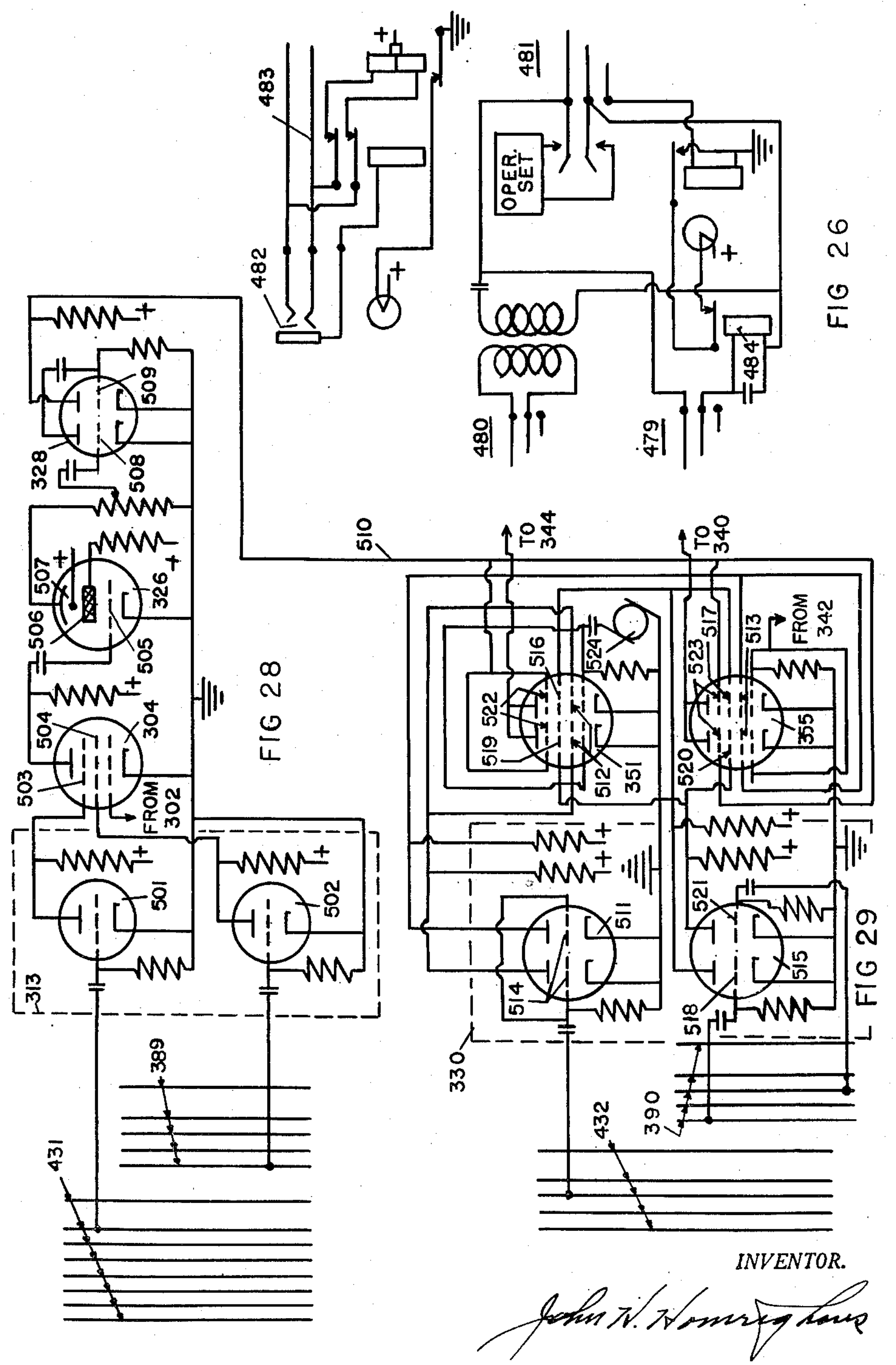
Figure 26 shows a cord circuit for connecting radio terminal circuits to telephone lines.

Figure 26 shows a cord circuit for extending radio call to telephone lines.

Figure 27:
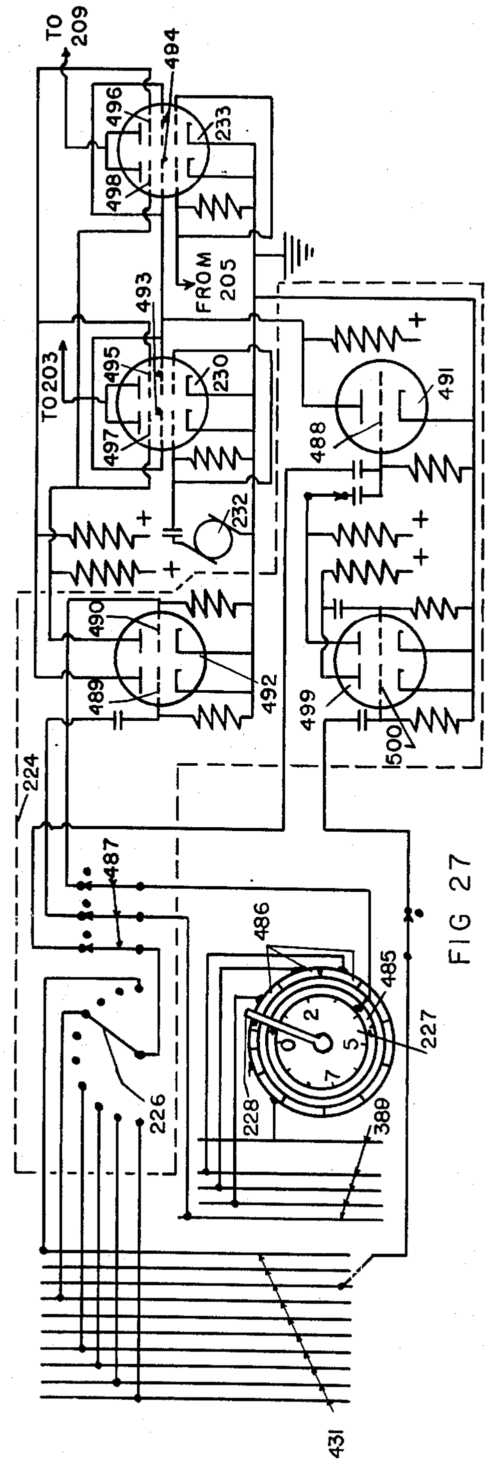

Figure 27 shows apparatus and associated circuits for an altitude selector for mobile stations to select different periods of time under the control of an altimeter instrument for the transmission of signals representative of the altitude of the plane.

Figures 28 and 29 show apparatus and associated circuits for position indicating selectors in the receiver and transmitter respectively forming a part of the relay or wayside stations. The selectors may select recurring periods for the transmission of signals representative of the particular mobile number and the number of the relay station to which a mobile station is signaling.

Figure 30:
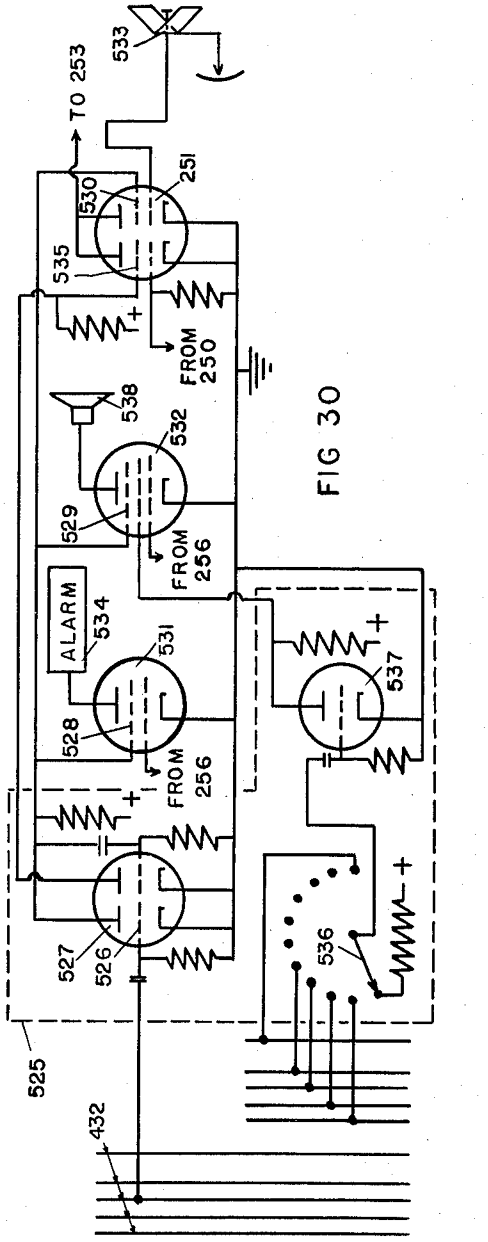

Figure 30 shows apparatus and associated circuits for an obstacle selector in mobile stations to select a group of channels for the reception of signals from a number of obstacle transmitting stations, and thereafter selecting any one channel for determining the direction of the obstacle transmitter relative the mobile station.

With further reference to Figure 1 which diagrammatically illustrates a radio communication system for airplane routes having two transmission paths or lanes between terminal stations such as the terminal station 11 at Omaha and terminal station 12 at Chicago, station 12 and terminal station 13 at Detroit, and station 12 and terminal station 14 at Cleveland. Intermediate these terminal stations there may be a number of spaced radio relay stations for amplifying and retransmitting or relaying the signals along a predetermined route as illustrated by the reference numerals 15 through 18, 23, 24, etc. A wayside station where calls may be originated or answered is shown at 25. Aircraft 26 through 31 flying the several routes may be communicating through a relay station within the shortest distance of the plane over channels of the same wave length as shown by the connecting lines 32 through 36. There may also be carrier wave channels between the several airplanes as shown by the connecting lines 37 and 38.

Referring to Figure 2 which diagrammatically illustrates a two channel radio communication system for railroads, one carrier wave channel may be for the transmission of message signals and train position indicating control signals west and a second carrier wave channel may be for the transmission of message signals and train position indicating control signals east. The terminal radio stations 39 through 42 may be separated by relatively large distances and at convenient locations for train dispatching services where it is desired to observe train movements along the tracks. Intermediate these terminal radio stations there may be a number of spaced radio relay stations 43 through 50 along the railroad tracks for amplifying and retransmitting the signals originated in the terminal stations or mobile stations and also for transmitting signals representative of its assigned number under the control of mobile stations in the several trains. A wayside station 51, intermediate terminal stations 40 and 41, may be provided for receiving and answering calls and also for observing train movements on the tracks between the terminal station through position indicating devices. Communication paths may be maintained between trains 52 and 53 moving along the double tracks and the terminal stations at both ends of the particular section of the railways through relay station within the shortest distance of either train as indicated by the connecting lines 54 through 57. Communication paths or channels may be employed between the mobile radio stations in the engine cab and caboose as illustrated by the connecting lines 58 and 59. Communication between moving trains may be over a carrier wave channel as illustrated by the line 60.

Referring to Figure 3 which diagrammatically illustrates two two-way radio communication systems for trucks and buses traveling a two-way street or highway. While I have shown only two types of vehicles, it is to be understood that other vehicles such as taxicabs may also have a separate communication system along the same route. The two communication systems illustrated may be similar except that different carrier wave frequencies are used for the two systems and the several stations in each system may operate without interference from non associated stations.

The radio communication system for trucks may utilize two carrier wave transmission lanes, one for transmission west and another for transmission east. Fixed terminal radio stations 60 and 61 may be at either end of the route with fixed intermediate radio relay stations 63 through 67 spaced along the predetermined route for retransmitting or relaying message signals to and from the terminal stations. Other radio relay stations not shown may be provided for greater distances between the radio terminal stations. Vehicle position indicating devices may be employed if desired as described above in connection with trains and airplanes, but it is thought that this type of service would not ordinarily be required for trucks, buses, etc. Communication channels may be maintained between trucks moving along the route in either direction through relay station within the shortest distance of the truck as shown by the lines 69 through 71. Communication channels may also be established between trucks as shown by the line 72.

The radio communication system for buses may be similar to that described for trucks. Two individual carrier wave transmission lanes may be provided, one for message signals transmitted west and another for message signals transmitted east. Terminal radio stations 73 and 74 may be provided at each terminal of the route with intermediate radio relay stations 76 through 81 spaced along the route for relaying message signals to and from the terminal stations. Other radio relay stations may be provided between terminal stations 73 and 74. A wayside station 82 may be provided for originating and receiving message signals. Vehicle position indicating apparatus may be provided if desired as described above. Communication paths may be maintained for buses 83 and 84 as shown by the lines 85 and 86. Also communication channels may be established between buses 84 and 87 as shown by the line 88.

While only a few airplanes, trains, trucks and buses are illustrated along the various routes, it is to be understood that the number shown does not represent the capacity of any of the communication systems, which will be more fully explained later.

With further reference to Figure 4, this figure illustrates a diagrammatic arrangement for assigning two digit numbers to a group of one hundred radio stations, and for allotting periods of time for the transmission and reception of message signals. In this arrangement I employ two series of saw tooth waves, one ten times the frequency of the other to select different periods of time for each station in the group. One saw tooth wave is shown vertically at 89 and the other saw tooth wave is shown horizontally at 90. By dividing each wave into ten parts as indicated by marks such as 91 and 92 and assuming that the horizontal frequency is ten times the vertical frequency we would have ten equally spaced horizontal lines in the frame diagram 93. An analogy to this is the scanning action over a cathode ray tube screen. Since each horizontal line is divided into ten equal spaces and there are ten lines in each frame, I may obtain one hundred imaginary areas for station number assignments or one hundred different periods of time per frame.

The location of each number in the frame may be considered as indicating the period of time that the assigned station may be capable of reproducing a message from received signals.

For an orderly arrangement of two digit station radiophone numbers, the first or tens digit of any number in the frame may be the number of the line counting from the top down and the unit digit is the space in the line counting from left to right; thus the radiophone number 94 is in line nine, space four as shown. The number 09 is bottom line space nine. It is not necessary to assign radiophone numbers as outlined above, but any number may be assigned to any period in the frame as desired.

It is to be understood that small groups of stations may be employed in any of the communication systems described herein by employing only the horizontal series of saw tooth waves.

Line and frame control signals or impulses as illustrated at 95 and 96 are transmitted at regular recurring periods between stations to control the development of line and frame or horizontal and vertical saw tooth waves.

With further reference to Figure 5, I have shown diagrammatically line and frame control signals for controlling or timing the development of saw tooth waves for the group of stations in any of the radio communications systems described above. The horizontal or line control signals 95 are equally spaced. The frame or vertical control signal 96 is of greater amplitude and appears between groups of line control signals. These control signals or impulses are for synchronizing the saw tooth timing waves at the several stations. The horizontal and vertical control signals may be of equal amplitude as shown in application Serial No. 542,317 filed June 27, 1944, now Patent No. 2,521,008, granted September 5, 1950.

With further reference to Figure 6 which diagrammatically illustrates a two transmission lane radio communication system along a conveyance route intended for the transmission of sound message signals and control signals. This communication system may represent the radio communication system for buses described in connection with Figure 3 and the radio stations have been so numbered. Although all the stations in Figure 3 have not been shown, it is to be understood that any number of automatic radio relay stations, such as 76 may be employed between terminal stations 73 and 74. Terminal station 73 may signal the wayside station 82 or the terminal station 74 over carrier waves of the same frequency through the automatic radio relay station 76. Terminal radio station 74 may signal station 73 over a carrier wave having a different frequency through stations 82 and 76. The two terminal stations 73 and 74 may be similar. Each terminal station comprises a transmitter 97, saw tooth generators and channel control mechanisms, 98, and a receiver 99. The transmitter 97 may transmit signals intermittently for signaling a called station or in other words signals from station 73 may be transmitted during certain reoccurring periods. Likewise the receivers 99 may be arranged to reproduce the received signals only during certain predetermined periods. The generator and mechanism 98 comprise saw tooth generators with apparatus and suitable circuits to produce timing impulses for controlling signal transmission and reception. Synchronizing signals may be produced in one station and transmitted to all other stations to synchronize the saw tooth generators.

The saw tooth waves shown in Figure 4 may illustrate one line saw tooth wave and one frame saw tooth wave of two series that may be produced in either terminal station, the wayside station 82 and the mobile stations 83, 74 and 87 for allotting periods of time for the tranmission and reception of signals.

The terminal stations 73 and 74 may be provided with a microphone and speaker 100 and 101 adapted to be disconnected by insertion of the plugs in the cord circuits 102. The cords 102 may extend the radio channel through telephone line apparatus at 103 and 104 to subscriber's stations or trunk lines to the telephone office 105.

The mobile stations 84 and the wayside station 82 may be similar. Since these stations may be required to transmit on both carrier waves simultaneously each station 82 and 84 may comprise two transmitters 106 and 107, two receivers 108 and 109, and saw tooth generators and channel control mechanism 110. Each of the transmitters 106 and 107 may transmit message and control signals during intermittent periods. The receivers 108 and 109 may be arranged for the reception of signals during certain periods. The generator and channel mechanism 110 in each station are similar to the generator and mechanism 98 described above.

Station 84 may also be considered as a portable relay station which may be used to replace another station such as 82 in case of an emergency or it may be used to extend the communication route.

The wayside station 82 may be equipped with a microphone and speaker 111 for communication east or west through switch 112.

The automatic radio relay station 76 may comprise two amplifiers 113 and 114 to amplify and retransmit received signals without demodulation and remodulation.

Reflectors 115 may be provided for each transmitter antenna in the relay and the wayside stations to prevent radiation to their associated receiving antennas.

Mobile stations 83 and 87 may be similar to terminal stations 73 and 74 except that they are provided with adjustable tuning switches 116.

The mobile radio stations may be provided with lower output power because they may transmit signals over less distance than the fixed stations.

In Figure 6 I have illustrated two transmission lanes A for transmitting east, and B for transmitting west, also a terminal station at either end of the route. In the operation of truck fleets, bus fleets, etc., it may only be necessary to have one main dispatching or terminal station, therefore the wayside station 82 and terminal station 74 may be omitted.

Figure 7 illustrates diagrammatically the signaling periods and radiophone numbers for the mobile, wayside and terminal stations in one of a series of frames which may be produced in Figure 6. The number assigned to the periods or channels may be the station numbers shown in Figures 3 and 6. The periods alloted to signaling may be varied to suit operating conditions. This numbering arrangement may apply to both transmission lanes A and B. The horizontal saw tooth timing wave frequency may be twice or four times the vertical saw tooth timing wave frequency.

While I have described the radiophone system in Figures 6 and 7 as applied to the communication system as shown in Figure 3, it is to be understood that this system is equally applicable to the communication systems for Figures 1 and 2 where mobile position indicating and altitude indicating devices are not desired.

Each station in the communication system shown in Figure 6 including the mobile stations may have a number which is assigned to a particular area in the time frame or a definite period developed by the saw tooth timing waves as shown in Figure 7. This numbered period may be associated with the station call channel or path. It is to be understood that for a few stations only the line saw tooth timing wave generator would be employed.

Station 73 may call station 74 by selection of the proper period of time in successive saw tooth waves to transmit signals and thereafter the calling party may talk to the called party at station 74 informing the called party that station 73 is calling, whereupon the called party to communicate with the calling party will adjust the channel selector in his transmitter to select the call number or channel 73 to transmit signals during recurring periods. Saying it differently, each station is assigned a call channel which is associated with his station radiophone number, and for two-way conversation between two stations both station channels would be employed with each station transmitting signals over a selected channel and receiving signals over its assigned call channel.

At the same time that the parties at the terminal stations are talking, other talking channels may be established between mobile stations going in the same direction or traveling in opposite directions. The mobile station channels may be direct from one station to another station when the distance between them is relatively short. But channels may be through the relay and wayside stations where the distance between two stations is relatively great. Mobile station to communicate with either terminal station may transmit on one frequency and receive signals on a different frequency, therefore, a mobile station calling another mobile station over a short distance may through the operation of panel switches 116 transmit on a different frequency than the called station. The two terminal stations 73 and 74 transmit on different frequencies.

The wayside station 82 comprises two transmitters and two receivers for demodulating and remodulating signals in the two transmission lanes A and B. This wayside station may be located in an area without regular telephone service and calls may be made from this station to either terminal station through the operation of switch 112. At the terminal stations connections may be made to telephone lines.

Either of the mobile stations 83 or 87 may be considered as portable for maintenance crews, or they may be considered as fixed station in some isolated community where they may be employed to establish private communication paths to distant telephone offices without interfering with or overlapping of signals in the regular communication lane.

In station 73 certain of the signals received over the transmission lane B may be retransmitted over carrier wave channels in the transmission lane A so that all mobile stations may transmit over B and receive signals over A in order that one mobile station may signal and talk to any other mobile station in the system without searching to find out whether the called mobile station is east or west of the called station, to be more fully explained later.

With further reference to Figure 8 which diagrammatically illustrates another two carrier radio communication system along a conveyance route intended for the transmission of message signals, including control and other signals for operating mobile position indicating devices. This communication system may be considered as a modification of the system shown in Figure 6, which modification comprises primarily the features of indicating or showing at the terminal and mobile stations the relative position of the mobile stations moving along the route, also "on course" signals where desirable with aircraft. This communication system may represent the communication system for airplanes and trains described in connection with Figures 1 and 2 and the radio stations 12, 23, 24, 25 and 14 are the stations having similar numbers in Figure 1 and may also be considered as stations 40, 46, 47, 51 and 41 in Figure 2. Although all the stations in either Figure 1 or 2 have not been shown, it is to be understood that any number of automatic radio relay stations or booster stations such as 23 and 24 may be employed to extend the signaling range. Terminal station 12 may signal over one carrier wave C the wayside station 25 or the terminal station 14 through the automatic radio relay stations 23 and 24. Terminal radio station 14 may signal station 12 over another carrier wave D through stations 25, 24 and 23. The two terminal stations 12 and 14 may be similar. Each terminal station comprises a transmitter 117, saw tooth generator and channel control mechanism 118, and a receiver 119. The transmitter 117 may transmit signals in recurring periods. Likewise the receivers 119 may be arranged to reproduce received signals only during certain predetermined periods. The generator and channel mechanism 118 comprise saw tooth generators with apparatus and suitable circuits to produce timing impulses for controlling the transmitting and receiving periods.

The mobile stations 31 and the wayside station 25 may be very similar. Since these stations may be required to transmit on two different carriers simultaneously, each station may comprise two transmitters 120 and 120', two receivers 121 and 121', and a saw tooth generator and control mechanism 123. Each of the transmitters 120 and 120' may transmit messages and other signals during intermittent periods. The receivers 121 and 121' may be arranged for the reception of signals only during certain periods. The generator and mechanism 123 in each station is similar to the generator and mechanisms 118 described above. The wayside station 25 may have a microphone and speaker 124 for communicating either east or west by the operation of switch 125. Each transmitter in the wayside station may have an antenna 126 for transmitting "on course" signals outward at an angle to the route.

The automatic radio relay stations 23 and 24 may be similar, and since each relay station is required to initiate signals representative of its station number under the control of mobile transmitters, it is necessary for each station to be provided with two transmitters 127 and 128 having "on course" antennas 126, two receivers 129 and 130, and a generator and control mechanism 131, all of which may be similar to the mobile stations described above.

Channel busy indicating, altitude indicating and mobile position indicating devices 132 are shown in all stations except the relay stations.

Any relay station receiving mobile position control signals from a mobile station representative of the mobile station number may produce other signals in a different period representative of the relay station number. These latter signals are transmitted to the terminal stations and also back to the mobile station to operate the indicating devices in both the terminal and mobile stations.

Reflectors 133 may be provided for each antenna 126 in the relay and wayside stations to direct the radiated energy at an angle to the route.

The antennas 134 are transmitting antennas for the propagation of radiant energy between fixed stations, and between fixed and mobile stations. The antennas 126 are to direct "on course" signals during certain reoccuring periods outward from either side of the stations or conveyance route by their associated reflectors 133. These signals directed from each side of each relay station and the wayside station may overlap directly above the route and the booster stations so that "on course" indicating devices in the airplane flying the route may be operated to indicate to the pilot when he is flying on the course or to one side of the course. The pilot may receive through a loud speaker the name of the city to which he is flying when on the course or at one side of the course. Should it be necessary on certain routes to fly airplanes at the same height in both directions the "on course" signals through the adjustment of reflectors 133 may be prevented from overlapping directly above the route.

The mobile stations 28 and 29 may be very similar to the terminal stations and like reference numerals designate like parts except that these stations may be provided with switches 134' for talking either east or west.

The mobile stations moving along the route in Figures 1 and 2 may be of lower power than the fixed stations since they may transmit over shorter distances.

The terminal stations 12 and 14 may be provided with a microphone and speaker equipment 135 and 136 respectively. This equipment may be disconnected by the plugs on the cord circuits 137. The cords 137 are for associating the radio channels with telephone line or trunk apparatus 138 and 139 for communication with telephone subscribers or over trunk lines to the telephone offices 140 and 141.

In Figure 8 I have illustrated two carrier transmission lanes, C for transmission east and D for transmission west. While I have shown a terminal station at either end of the route it is to be understood that only one terminal station may be employed. Furthermore the talking period may be extended as described in connection with Figure 6.

In station 12 certain of the message signals received over the transmission lane D may be retransmitted over carrier wave channels in the transmission lane C so that all mobile stations may transmit signals on the same carrier frequencies in transmission lane D and receive signals over carrier wave channels having the same wave length in transmission lane C, in order that any one of the mobile stations in the system may signal and talk to any other mobile station in the system without searching to find out whether the called station may receive signals over transmission lane C or D, to be more fully explained later. While I have shown station 12 as the dispatching office with signals transferred from one transmission lane to a second transmission lane it is to be understood that station 14 may be the dispatcher's office with certain signals transferred therein from one transmission lane to a second transmission lane.

Referring to Figure 9 I have shown a period of time frame 142 showing an arrangement for assigning channel numbers to the different periods. Line one may be assigned to the terminal, wayside and mobile stations in the communication system illustrated in Figure 8. Line 2 may be assigned to facsimile equipment or teletype equipment. The third line may be designated by a mobile station number and the letter P to show that this line may indicate the position of the conveyance relative to the fixed stations in the system. The fourth line may be designated by the same mobile station number and the letter A to show that this line may indicate the altitude of the mobile aircraft station. As shown, lines 5 and 6, and 7 and 8 may be for position and altitude indicating for other mobile stations. In line 9 I have shown two periods 143 and 144 that may be used in aircraft communication systems to give visual indications when the aircraft is on the proper side of course. At 145 and 146 signals may be transmitted for the city name toward which the plane is flying. The periods 143 and 145 may be used when plane is flying west to east and the periods 144 and 146 may be employed when plane is flying east to west. In the last line the different periods may be assigned to vehicles traveling the route for the transmission of signals only from the mobile stations to the fixed stations.

Figure 10 is a modification of Figure 9 showing mobile position number assignments for a larger group of fixed stations. It is therefore seen that the number of fixed station assignments may be variable.

While I have described the communication system in Figures 8 and 9 as applied to the communication system shown in Figures 1 or 2, it is to be understood that this system may be used with Figure 3 when mobile position indicating devices are required.

Station 12 may call station 14 by the selection of a proper channel or period of time in successive saw tooth timing waves to transmit signals. Station 14 may then call station 12 over another channel similar to the method described for Figure 6.

Other talking channels may be established between mobile stations going in the same or traveling in different directions. One mobile station may establish a channel direct to another mobile station where the two stations are relatively close together. But where the distance between two mobile stations is relatively great the signals may be retransmitted by one or more relay or booster stations. The mobile stations may communicate with either terminal station or the wayside station similar to the method described for Figure 6. Two mobile stations may transmit signals on different frequencies for two-way direct communication between the stations. Since each station has an individual period assigned for receiving signals, any number of two-way private conversations between pairs of stations may be taking place at the same time.

The wayside station 25 comprising two transmitters and two receivers may be located in an area without regular telephone or telegraph services. In this station calls may be initiated to or received from either terminal station. At the terminal stations telephone subscribers may be associated with any talking radio channel.

The mobile stations 28 and 29 may be considered as portable for maintenance crews or they may be located in some isolated area where they may be employed to establish private communication paths to distant radio offices or distant telephone offices.

Altitude indicating is only intended for airway communication systems. The operation may be as follows: in the mobile station signals may be transmitted in different periods of time depending upon the dial reading of a conventional altimeter in the aircraft. This meter may show the height above the terrain or above sea level. The altitude signals transmitted to the relay stations in succession as the aircraft travels the route may be retransmitted in certain booster stations to the terminal station where they may show on an indicating device the altitude of aircraft as indicated on its altimeter.

Mobile positions indicating is primarily intended for airways, although it is equally applicable to trains and trucks. The operation may be as follows: as a mobile station travels along the route, signals are transmitted in a certain period of time that may be associated with the vehicle identifying number. A relay station upon reception of these signals may through the actuation of certain apparatus transmit signals in two other recurring periods of time, one period for signals representative of a line group or some other identifying position in the period of time frame Figure 9, assigned to the mobile station identification number, and the second period for signals representative of the particular relay station receiving the vehicle identifying signals. Thus relay station 23 responsive to vehicle number signals may transmit signals in the period numbered 23 in the particular line assigned to the vehicle. These signals may be employed in the receivers at the terminal stations and all mobile stations on the route to show the position of the mobile station relative to the fixed stations. As the vehicle or aircraft moves along the route relay station 24 responsive to the vehicle number or mobile position control signals may transmit signals in the period numbered 24 in the same line, and after the aircraft travels out of the receiving range of station 23 the position indicating mechanism in station 23 will be restored to normal thereby preventing further transmission of signals from station 23 representative of the station position or mobile position. The relative position of all mobile stations moving along the route will be indicated in the indicating devices in the terminal stations and in the mobile stations.

Each terminal station may have a message recorder for repeatedly transmitting in certain periods the name of the terminal city toward which the aircraft is flying, to aid the pilot in flying the predetermined route, also signals may be initiated in certain periods in each relay and booster station and transmitted outward. These latter signals will cause a visual indication in the aircraft to indicate when the pilot is flying on the proper side of the route.

Since the "on course" signals and the name of the city may be transmitted in different periods for the two transmission lanes C and D, it is thought that these signals together with the position indicating signals will be of considerable aid to pilots in providing them with automatic means for indicating their location relative the relay stations along a definite route.

With further reference to Figure 11, I have shown a two-way communication system utilizing but one carrier wave. This communication system may be used in any of the systems shown in Figures 1, 2 and 3. It is particularly applicable for taxicabs, delivery trucks, and buses. For the purpose of this description it will be considered for the truck communication system in Figure 3 and similar station numbers have been used. Terminal station 60 may signal any mobile station directly or through one or more outward repeater stations such as 64. Any mobile station 62 or 63 may signal and talk to the dispatcher's or terminal station 60 through a direct channel or through one or more inward repeaters such as 63 and 65. The terminal station and the outward repeater may transmit at relatively higher power and have much higher antennas than the inward repeater and mobile stations. Therefore it may be necessary to space the inward repeater stations closer together than the outward stations. This arrangement of relay or repeater station spacing may also be employed in Figures 6 and 8. The terminal station to signal and talk to any one of the mobile stations transmits signals in recurring periods different than the transmitting periods for the mobile station.

The terminal or dispatcher's station 60 may be similar to the relay stations 63, 64 and 65 and the mobile sations 62 and 68. Each of these stations may comprise a transmitter 147, saw tooth generator and channel mechanism 148, and a receiver 149. All of the stations being similar to the terminal stations in Figures 6 and 8 and further description is thought to be unnecessary. Since each relay station will be required to distinguish between signals by the period in which the signals are transmitted, it is necessary that the signals be demodulated for separation and then retransmitted. Therefore, the receiver in relay station 64 may be blocked or inoperative while signals in relay stations 63 and 65 are being transmitted. Likewise the receivers in stations 63 and 65 may be blocked during the time that station 64 is retransmitting. The reflectors 150 are primarily for the purpose of preventing radiation from the antennas 151 from effecting their associated receiver antennas.

Referring to Figure 12, I have shown a period of time frame 152 showing an arrangement for assigning station numbers to different periods in the upper half of the frame with the same radiophone numbers appearing in the lower half of the period of time frame. The terminal station 60 may transmit signals during any period in the upper half of the frame and the mobile stations normally are arranged to transmit signals during any period in the lower half of frame. Each mobile station may receive signals only in one period for the upper portion of frame and a like period for the lower portion of the frame. For one mobile station to call another mobile station toward the east, the calling station may transmit during a certain period in the upper part of frame. But if the called station is west of the calling station, then the calling station will signal the called station by transmitting signals over the called station channel in the lower portion of the frame.

The communication system described above for Figures 11 and 12 may serve from a few stations to fifty on one carrier wave length where any station may signal any other station in the system. But where it is desired that the communication may be between only the terminal station and the mobile stations then more than ninety stations may be served on a single carrier wave length. Still a greater number of stations may be served over one carrier wave length by features covered in my dimensional system described in above mentioned application.

In the communication systems shown in Figures 1 through 12 I have described three systems in connection with relatively long conveyance routes employing a number of relay or booster stations. However, one terminal station only in Figures 6 and 8 may be used with a number of mobile stations which may be applicable to delivery trucks in local areas, or to stores and offices.

The distance between automatic radio relay stations or booster stations and between relay stations and terminal stations may be determined by the length of the carrier wave used and the power output of the stations. For relative short waves, stations may be spaced approximately twenty miles or "line of sight" distances. Where longer carrier wave lengths are used the spacing may be at greater distances.

With further reference to Figure 13 which shows an arrangement of radio stations along several routes which may be applied to airplane routes west to east and north to south across the country; that is, the stations intermediate all terminal stations are numbered from 2 up west to east and north to south. Having carrier waves A and B transmitted east and carrier waves C and D transmitted west, also in alternate routes different carrier waves E and F transmitted north and carriers G and H transmitted south. Carrier waves on adjacent routes west to east may have different frequencies or carrier waves A through D may comprise two different frequencies west to east and two other frequencies east to west used in alternate routes across the country. With the radio stations aranged as shown in Figure 13 and a radio communication system as shown in Figure 8 a pilot may fly his plane over any route in zero visibility and know his relative location at all times as well as the direction and station to which he is approaching. Furthermore he may be at all times in communication with the terminal station through the auxiliary booster stations. This arrangement should aid a pilot in determining his location and direction to port. Through continuous communication with the relay stations it will also enable him regardless of relative strong side wind to fly the shortest route between two terminals or the predetermined route.

By using frequency modulation the mobile receivers may be responsive to the strongest signals received from the stations which should be the nearest station to the plane. Therefore, it may only be necessary to use one carrier frequency for east-west traffic and another carrier frequency for north-south traffic.

The relative postion of all planes moving along the predetermined route as well as the altitude of each plane may be shown in each plane and the terminal offices.

Again referring to Figure 14 which illustrates a time period or channel number frame for a number of large groups of different services including mobile position and altitude indicating. For instance, the various periods in the top line may be assigned to facsimile and teletype messages. The second line may be assigned for messages to terminal stations and wayside stations. Line three may be assigned for highway communication to and from telephone offices, whereby any mobile station may call a telephone office to be connected with a telephone subscriber. Lines four and twenty may be assigned to mobile stations traveling the route. Lines five through nine and lines fourteen through eighteen may be assigned to position and altitude indicating as shown by the letters "P" and "A". The periods in the position indicating lines and the altitude indicating lines may be shorter than the periods for talking or twenty periods in each line. Two lines may be used for each type of service when there is a larger number of stations along the route or when the aircraft is expected to exceed eighteen thousand feet altitude. The station numbers shown in Figure 14 correspond to certain stations in Figures 1 and 8.

The second line from bottom may have a period indicated 145' to transmit or receive the city name of the East terminal station. Periods 143' and 144' are for "on course" signals and the period indicated 146' may be to transmit or receive the city name for the West terminal station. This arrangement being similar to that described for Figure 9.

The periods in the bottom line may be assigned numbers representative of the vehicles traveling the route. These periods are utilized only in the relay and mobile stations to be explained more fully later.

While I have shown only two carrier frequencies for all the different services in Figures 6 and 8 as illustrated in Figure 14, it is to be understood that a number of carrier waves may be employed for transmission in either direction if desired.

With further reference to Figure 15 showing a channel arrangement between a number of stations, the fixed stations and mobile stations correspond to certain of the stations in Figures 1 and 8 and have similar numbers. At the terminal stations 12 and 14, and the mobile stations 27, 28 and 29 I have illustrated only partial frames for period of time or channel selection, with only three periods shown in a few lines in each of the transmitter selector frames 154 and the receiver selector frames 155. The relay station 23 and the wayside station 25 each have two transmitters and two receivers, one set for west to east transmission lane and another set for east to west transmission lane. For each set I have illustrated partial frames for the period of time or channel selection which may be similar to those in the fixed station. The transmitter selector frames for west to east traffic being designated 156 and the receiver selector frames are designated 157. The transmitter selector frames for east to west traffic being designated 158 and the receiver selector frames are designated 159.

In the communication systems described herein each station may receive signals for each type of service over certain assigned channels, or each station may have one or more channels for each type of service corresponding to certain assigned periods of time to receive message signals. Therefore, each station may transmit message signals over selected channels but may receive message signals only through certain assigned channels.

The different periods or channel numbers shown in Figure 15 correspond in part to the numbering scheme shown in Figure 14, with like periods in all frames having similar numbers.

Assuming that a facsimile message is to be transmitted from terminal station 12 to terminal station 14, then the channel or period designated F14 comprising the called station number shown in the transmitter selector frame 154 station 12 would be selected for the transmission of facsimile signals over the channel path illustrated by the line 160 to the corresponding F14 shown in the receiver selector frame 157 relay station 23. In station 23 the signals may be demodulated and retransmitted during a corresponding period F14 as shown in the transmitter selector frame 156 over a carrier channel channel illustrated by the line 161 to the corresponding periods F14 in both the receiver selector frame and the transmitter selector frame station 25. In station 25 the signals may be demodulated, amplified and retransmitted over a carrier wave channel illustrated by the line 162 to the corresponding period F14 in the receiver selector frame 155 terminal station 14. These facsimile signals would also be picked up by the mobile stations 27, 28 and 29 over carrier wave channels 161′, 161″, and 162′ from the intermediate stations 23 and 25 and terminal station 14.

For a return facsimile message, channel designated F12 in the transmitter selector frame 154 station 14 would be selected for the transmission of facsimile signals over a channel indicated at 163 having a different carrier frequency, to the corresponding period F12 in the receiver and transmitter selector frames 159 and 158 station 25. In station 25 these facsimile signals may be demodulated and retransmitted over a channel indicated at 164 to the relay station 23 where the signals may again be retransmitted during the corresponding period F12 over a channel designated 165 to the receiver selector frame 155 terminal station 12.

Channels for sound message signals between parties at the terminal stations 12 and 14 may be over carrier wave channels similar to the channels described for facsimile signals.

Assuming that a party at station 12 desires to talk with a party at the wayside station 25 then the channel or period of time designated R25 assigned to station 25 would be selected in the transmitter selector frame 154 station 12 for the transmission of signals representative of sound over the carrier wave channel 166, through station 23, over carrier channel indicated at 167 to the receiver selector frame 157 station 25, where the signals may be intercepted to be more fully explained later. However, the signals would be retransmitted at station 25 over carrier wave channel 168 to the receiving selector frame 155 showing that the channel is busy to be explained later. Channel busy conditions are shown in the mobile stations over carrier wave channels indicated at 167′, 167″ and 168′. In a similar manner the fixed stations 12, 14 and 25 may call any one of the mobile stations. To establish talking channels from station 25 to station 12 a period of time R12 assigned to station 12 would be selected in the transmitter selector frame 158 station 25 for the transmission of message signals over a carrier wave channel indicated at 169, through relay station 23, over a carrier wave channel 170 to the corresponding period R12 in the receiver selector frame 155 terminal station 12.

Assume that the attendant at the mobile station 28 desires to talk to the attendant at the mobile station 29. Then the channel or period of time designated M29 in the transmitter selector frame 154 station 28 would be selected for the transmission of message signals. It is also assumed that station 29 is out of range for the relatively short carrier waves transmitted from station 28. Therefore, the modulated carrier waves would be transmitted over the carrier wave channel indicated at 171 to the corresponding period in the receiver selector frame 159 relay station 23 where the signals may be demodulated, amplified and retransmitted in a like period over the carrier wave channel indicated at 172 to a like period in the receiver selector frame 155 station 12. In station 12 after demodulation the signal may be fed to the transmitter and retransmitted in the same recurring periods M29 over a carrier wave channel indicated at 173 having a different wave length to the relay station 23, retransmitted at station 23 over channel indicated at 174 to the wayside station 25, retransmitted at station 25 over channel indicated at 175 to the terminal station 14 for indicating that the channel is busy. At station 25 the signals may be transmitted in the same period M29 or over the carrier wave channel indicated at 175′ to station 29 as shown in the receiver selector frame 155, where the signals may be reproduced as sound.

The called party at station 29 to answer the call may select the period or channel M28, assigned to station 28 for the reception of signals. In the transmitter selector frame 154 the transmission of signals may be over the carrier wave channel indicated at 176 to the wayside station 25. The signals being retransmitted in station 25 over carrier wave channel indicated at 177 to the relay station 23, retransmitted at station 23 over carrier wave channel indicator at 178 to the receiver selector frame 155 station 12. In station 12 the message signals after demodulation may be amplified and retransmitted over a carrier wave channel indicated at 179, having a different wave length, to the relay station 23, retransmitted at station 23 over a channel indicated at 180 to the station 25, through station 25 over carriage wave channels indicated at 181 and 181′ to the terminal station 14 and the mobile station 29 to indicate station 28 as being busy. From the relay station 23 the signals may also be retransmitted over a carrier wave channel indicated at 180′′ to the mobile station 28 where the message signals may be reproduced as sound.

From the above description it is shown that two-way conversation between mobile stations may utilize any number of intermediate relay stations to cover relatively long distance between the mobile stations.

The relative position of all vehicles along a route provided with a communication system as described herein may be shown in both terminal stations and all of the mobile stations traveling the route. Likewise the altitude of each aircraft moving along a predetermined route may be shown in both terminal stations and the mobile stations in each aircraft flying the route so that the operator of each craft may know the position and altitude of all the mobile units traveling the predetermined airway.

Considering the method for indicating the relative position of mobile stations I assign certain definite recurring periods of time for each mobile station to transmit signals to the several relay stations in succession as it moves along the route. For instance the mobile station 28 may be assigned the first period in the last line in the transmitter selector frame 154 arbitrarily designated 28 to correspond to the mobile station number. During this period control signals may be transmitted over a carrier wave channel indicated at 182 to the relay station 23 as shown in the period designated 28 in the last line of the receiver selector frame 159. Signals produced during the recurring periods 28 in station 23 are not broadcast but they may be employed to actuate certain apparatus, to be more fully explained later, whereby other signals may be transmitted in two different periods which have been assigned 28P and 23, 28P for the first period of a particular line as a marker for the vehicle and 23 for a second period in the line to indicate the number of the relay station which in this case is 23. Signals may be transmitted in these latter periods over carrier wave channels indicated at 183 to two similar periods in the receiver selector frame 155 station 12, where they may be utilized to indicate corresponding positions on a cathode ray tube screen, not shown, thereby indicating the position of the mobile station 28 relative to the relay station 23, to be more fully explained later. In station 12 the signals for the mobile marker and mobile position may be retransmitted in like periods over a carrier wave channel indicated at 184, having a different wave length, to relay station 23. In station 23, these signals, after demodulation, may be retransmitted over a carrier wave channel indicated by 185 to the wayside station 25 where they are again retransmitted over a channel indicated at 186 to corresponding periods indicated at 28P and 23 in the receiver selector frame 155 terminal station 14. At station 14 the signals may be employed to indicate on another cathode ray tube screen, not shown in Figure 15, the position for the mobile station 28 relative to the relay station 23. The mobile stations 27, 28 and 29 receive these same signals over carrier wave channels indicated at 185′, 185′′ and 186′ to show the position of the mobile station on other cathode ray tubes in the mobile stations.

Assume that mobile station 27 is moving past station 25 then control signals produced during recurring periods designated 27 in the last line of the transmitter selector frame 154, may be transmitted over a carrier wave channel as indicated to the relay station 25 in the corresponding period designated 27 in the receiver selector frame 159. Signals produced during the recurring periods 27 in station 25 may be utilized to control station apparatus, whereby signals may be transmitted during two other periods which have been assigned 27P and 25, 27P for the first period in another line as a marker for the vehicle, and 25 for a second period in the line to indicate the number of the relay station. Signals may be transmitted during these latter periods from station to station, as explained in connection with mobile station 28, to indicate at both terminal stations and all the mobile stations the position of mobile station 27 relative the relay stations. In like manner the position of any motor vehicles along the route in relation to the nearest relay or intermediate station may be shown in the terminal station and the mobile stations.

Considering the method for indicating the altitude of all aircraft flying predtermined airways having communication systems as described herein, I provide in each aircraft station an altimeter, not shown in Figure 15, which causes signals to be transmitted in different periods of time or over different channels as the aircraft changes its altitude, to be more fully explained later. For instance, an altimeter in the aircraft housing mobile station 29 may cause signals to be transmitted during a number of different periods of time. As illustrated in the transmitter selector frame 154, there is a marked period deisgnated 29A to correspond with the number of the mobile stations or aircraft. The second period may be automatically shifted from one up to twenty or more depending upon the altimeter reading. In station 29 the second period is at 4 indicating that the aircraft is flying at four thousand feet. Signals may be transmitted in these two periods over carrier wave channels indicated at 187, to the wayside stations 25. Signals for these altitude indicating periods may be transmitted from station to station in a manner similar to that described above over carrier wave channels 188, 189, 190, 191, and 192, also the mobile stations 27, 28 and 29 may receive these signals over carrier wave channels 191′, 191′′, and 192′, whereby indicating devices in both terminal stations and all the mobile stations flying the course will show the altitude of the aircraft housing station 29. Should the aircraft rise or descend then the second period would be changed to a higher numbered period or a lower numbered period to agree with the altimeter reading.

The other mobile stations 27 and 28 may transmit signals in other periods in a manner similar to that described for station 29, whereby the indicating devices in the fixed and mobile stations may show their altitude.

From the above description it is shown that signals from all the mobile units for talking, position indicating and altitude indicating may be transmitted over a transmission lane or carrier wave channel from the west terminal station to the east terminal station, whereby all mobile stations and terminal station indicating devices may show a busy condition for talking periods in service and also show the position of all mobile stations relative the fixed stations, and in connection with airways to also show the altitude of all aircraft on route.

In the above description the west terminal station 12 was considered as the dispatching office. Should the east terminal station 14 be considered the dispatching office then the signals for talking, position and altitude indicating would be transferred in station 14 instead of station 12 to transmit the signals from east terminal station to the west terminal station.

Again referring to Figure 16 which shows a transmitter 117, with associated saw tooth timing generators and channel control mechanism 118, for either a terminal station or either one of the mobile stations 28 or 29 in Figure 8. This transmitter may also be used for similar stations in the radiophone systems shown in Figures 6 and 11. One set of generators and control mechanism only would be required for stations having two transmitters and two receivers such as station 31.

The transmitter 117 in the terminal stations may comprise a number of channel selectors, one for each type of service to select timing impulses for recurring periods or a channel in a transmission path for the intermittent transmission of message signals. As illustrated the channel selector 193 is for facsimile messages, 194 is for sound messages, and 195 is for recorded sound messages which repeat the name of one of the terminal cities. Each of the selectors may receive over conductors indicated at 196 and 197, two series of timing impulses in spaced periods from the channel mechanism 118, one series to select groups of numbered periods or the tens digit in two digit numbered periods, and a second series to select the individual periods in a group or the units digit in the two digit numbered periods. The timing impulses may through the two rotary switches 198 and 199 in each selector 193 and 194 control the selection of a channel or period of time for the transmission of message signals.

Facsimile signals produced in the mechanism at 200 may be fed to the amplifier 201. This amplifier controlled by timing impulses over the conductors 202 may supply the facsimile signals over a channel selected by the operation of switches 198 and 199 in the selector 193 to the reactance modulation amplifier 203. The signals from the modulation amplifier 203 are fed to the oscillator 204 and then applied to the frequency multiplying amplifier 205, thereby, producing a high frequency modulated carrier wave which may be further amplified at the power amplifier 206. This power amplifier may be controlled by the selected timing pulses supplied over conductors 207, to supply the frequency modulated carrier waves through the selected channel to the antenna 209 through the switch 210 in the pilot or dispatcher station. In mobile, secondary or satellite stations the modulated carrier waves may be applied to the signal control amplifier 208 where the modulated carrier wave may be fed to the antenna 209. The signal control amplifier 208 is under control of synchronizing signals to prevent signal transmission until the channel control or timing mechanism in the satellite station is in synchronism with incoming synchronizing signals to be more fully explained later. The signal control amplifier may be eliminated when desired by the operation of switch 210.

Sound signals developed at the microphone 211 may be applied through the key 212 and the spring assembly at jack 213 to the pre-amplifier 214. The amplifier 214 may be controlled by timing impulses in certain periods selected by the operation of the switches 198 and 199 in the channel selector 194 and applied over conductors 215 to supply fragmentary portions of the sound signals from the microphone 211 during the selected periods or over a second selected channel to the reactance modulation amplifier 203. These signals from amplifier 203 are fed to the oscillator 204 and then applied to the frequency multiplier 205, thereby, modulating the carrier wave with sound signals in the selected periods. The signals in the selected periods may be further amplified at the power amplifier 216. This power amplifier may be controlled by the selected timing impulses over conductors 217 for supplying the frequency modulated carrier waves through the second selected channel to the signal control amplifier 208 where the modulated carrier may be fed to the antenna 209 during different recurring periods than the periods for the facsimile signals.

Sound signals developed at the microphone 218 representative of the name of a route terminal city may be recorded on the magnetic wire or tape 219 for repeated reproduction to the pre-amplifier 220. The amplifier 220 may be controlled by timing impulses in certain fixed periods through the channel selector 195 over conductors 221 to supply fragmentary portions of the sound signals reproduced from the wire 219 over a third channel to the reactance amplifier 203. These signals from the amplifier 203 are fed to the oscillator 204 and then applied to the frequency amplifier 205, thereby modulating the carrier wave with sound signals in intermittent periods which may be further amplified at the power amplifier 222. This power amplifier may be controlled by timing impulses over conductors 223 for supplying the frequency modulated carrier intermittently to the signal control amplifier 208 for transmission from the antenna 209.

The mobile stations in addition to the channel equipments for facsimile and sound may have channel selectors 224 and 225 for aircraft altitude indicating and mobile position indicating respectively. The selector 224 may receive over conductors 196 a series of timing impulses from the channel control mechanism 118 to identify groups of channels. By manually operating the switch 226 a particular group of channels may be selected which have been assigned to the aircraft carrying the mobile station. Units timing impulses from conductors 197 may be supplied to the several commutator segments at the altimeter 227 so that the rotation of brush 228, in accordance with the altitude of the aircraft, may automatically select successive segments or different timing impulses as the aircraft carrying the mobile station gains or loses altitude. The impulse from the altimeter segments may be fed over conductor 229 to the selector 224. The amplifier 230 may be controlled by timing impulses from the selector 224 over conductors 231, in accordance with the setting of switch 226 and the position of the brush 228 in the altimeter 227. Therefore, signals from the generator 232 may be supplied during different periods or over any one of a number of channels as determined by the altitude of the aircraft to the reactance amplifier 203. These signals from the amplifier 203 are fed to the oscillator 204 and then applied to the amplifier 205 thereby modulating the carrier wave with altitude indicating signals in the selected periods. These signals may be further amplified in the power amplifier 233. The power amplifier 233 may be controlled by timing impulses over conductors 234 for supplying the frequency modulated carrier wave in the selected periods to the signal control amplifier 208 for radio transmission from the antenna 209.

The selector 225 may receive over conductors 196 and 197 the timing impulses from the channel control mechanism 118. These impulses may through switch 235 and 236 control the selection of a channel or period for the transmission of signals, from a mobile radiophone station to fixed radio stations, representative of a number arbitrarily assigned to the mobile station vehicle. The amplifier 237 controlled by timing impulses over conductors 238 may supply signals from generator 232 over a channel selected by the operation of switches 235 and 236 to the reactance amplifier 203. These signals from the modulation amplifier 203 are fed to the oscillator 204 and then applied to the amplifier 205, thereby modulating the carrier wave with signals representative of the vehicle number in the selected periods. These signals may be further amplified in the power amplifier 239. The power amplifier may be controlled by timing impulses over conductors 240 for supplying the frequency modulated carrier wave in the selected periods to the signal control amplifier 208 for transmission from the antenna 209.

Synchronizing signals produced at 118 in the dispatcher's or pilot stations for controlling the saw tooth generators may be fed through switch 241, over conductors 242 and 243 to the amplifier 244. From this amplifier the signals may be supplied to the amplifier 203, oscillator 204, amplifier 205, and power amplifier 245. The power amplifier 245 may be controlled by voltage impulses over conductor 246 to transmit the modulated synchronizing signal after each series of timing impulses to be more fully explained later.

In the dispatcher's or pilot station the amplifier 244 may also receive message signals over conductor 247 from the receiver circuits in the same station for retransmitting through the power amplifier 248. The power amplifier 248 may be controlled over conductor 249 from the station receiver to be more fully explained later.

Again referring to Figure 17 which shows a receiver 119, connected with the saw tooth timing generators and channel control mechanisms 118 described above. This receiver 119 is associated with the transmitter 117 and may be a part of either terminal station 12 or 14 or the mobile stations 28 and 29 in Figure 8. This receiver may be used for similar stations shown in Figures 6 and 11.

The antenna 250 receives the carrier wave signals from a distant antenna to a radio frequency amplifier 251. An oscillator 252 reacts with the signals in the first detector stage 253 on the heterodyne principle to produce an intermediate frequency which is supplied to the intermediate frequency stage 254 where after suitable amplification the intermediate frequency signals may be supplied through the limiter stage 255 to the discriminator 256; after detection in 256 the signals are supplied to the several power amplifiers 257 through 262. Synchronizing signals, being of greater amplitude than the message signals, are separated in the impulse amplifier stage 261 which is biased to eliminate message signals. From stage 261 in satellite stations the synchronizing signals may be supplied over conductors 263 and 264, through switch 265 to the saw tooth timing generators to control these generators in synchronism with the generators at the pilot station. The switch 265 in pilot station would be open. Two series of timing impulses are supplied from the mechanism 118 over conductors 266 and 267 to each of the channel selectors as illustrated.

The message signals supplied to the power amplifiers 257 through 260 are separated into their proper channels by the period of occurrence or the period in which they were transmitted as determined by the position of the switches 268 and 269 in the associated channel selectors 270 through 272. The channel selector 270 to select timing periods for facsimile messages may supply timing impulses over conductors 274 in accordance with the position of the rotary switches 268 and 269 to allot the proper or preassigned period of time for the power amplifier stage to be receptive to facsimile signals from the discriminator 256. From the power amplifier 257 the signals may be fed to the facsimile mechanism 275. In the several channel selectors the switches 268 and 269 may be in fixed positions where only one channel is used to receive signals for each type of service. The channel selector 271 for audible messages may supply timing impulses over conductors 276 in accordance with the position of its associated switches 268 and 269 to allot certain assigned periods for the power amplifier 258 to become conductive to certain audible message signals from the discriminator 256. From the power amplifier 258 the message signals may be supplied through the spring assembly at the jack 278, key 279 to the loud speaker 280. The bell may be actuated from received signals when the key is in its nonoperated position. The jack 278 in fixed stations may be located near the jack 213 in the transmitter so telephone subscribers may be connected over the radio channels through a connecting cord circuit to be more fully explained later. Removable plugs inserted into the jacks disconnect the bell and speaker, and at the transmitter the microphone and generator. The jack 278 and key 279 may be used in fixed stations only.

The channel selector 272 in the mobile stations for message signals may supply timing impulses over conductors 281 to allot a predetermined period in a particular group assigned for the reception of message signals representative of the name of the city toward which the vehicle with the mobile station is traveling. The switch 269 may have two positions, one to select a certain period when traveling east and the other position to select a different period when traveling west as previously described. Signals from the power amplifier 259 may be supplied through the key 282 to the loud speaker 283. The key 282 may be arranged to change the speaker 280 from the amplifier 258 to the amplifier 259.

The channel selector 273 may be located in the dispatcher's or pilot terminal station to condition the power amplifier 260 for the reception of several groups of signals from the discriminator 256 such as altitude indicating, mobile position indicating, and other message signals between mobile stations as described in connection with figure 15. The power amplifier 260 may be rendered conductive for all the message periods in a number of different groups by timing impulses received over the conductor 284. These same timing impulses may be supplied over conductor 249 to the amplifier 248 in the transmitter to control this amplifier for transmitting certain groups of signals. Message signals from the amplifier 260 may be supplied over conductor 247 to the preamplifier 244 in the transmitter. From this amplifier the signal may be fed through stages 203, 204, and 205 to the input of power amplifier 248.

From the limiter stage 255 in the receiver 119 the intermediate frequency signals received in special periods or through the several channels may also be supplied to channel control equipment 285 to produce an impulse for the intermediate frequency signals received in each period. The channel control equipment comprises an amplifier 286 to step up the voltage of the signals, a full-wave rectifier 287 where the signal voltages are further amplified and rectified as single spaced impulses, and a limiter stage 288 to eliminate ripple from the produced impulse which may be fed over conductor 289 to the amplifier 248 to render it conductive only during the periods that signals are received in certain groups, the groups being determined by timing impulses received over conductor 249. Thereby, retransmitting signals from the receiver 119 over a different carrier wave frequency from the transmitter 117.

The power amplifier 262 may receive all message signals from the discriminator 256 even though they are separated into individual messages through the action of the channel selectors described above. These signals from the amplifier 262 may be supplied to the indicating device or cathode ray viewing tube 132 of conventional type. This tube is provided with a fluorescent screen to produce images in all busy channel positions as outlined in the several periods of time frames Figures 7, 9, 10, 12, and 14. The electron ray is deflected in bidimensional direction to scan the screen by changing potentials produced in the mechanism 118 and supplied over conductors indicated at 290 and 291. The screen may be arranged with station and position markings as illustrated in Figure 14. Therefore, as any channel becomes busy there may be shown in a corresponding position on the screen a bright image. In the absence of message signals the control grids substantially extinguish the electron ray. Cathode ray tubes for indicating devices may be in all mobile and terminal stations. Before placing a call for a desired party the attendant may observe the cathode ray tube screen to determine whether the call channel for the desired party is busy.

For recording the picture images on the cathode ray tube screen, I provide a moving picture camera 292 in front of the tube screen. The shutter and film reel may be operated by the mechanism 293 under the control of synchronizing signals received over conductor 294 from the mechanism 118 in pilot stations, and received synchronizing signals in satellite stations. This recording camera is primarily intended for the dispatcher's station, but it may be employed in other fixed and mobile stations.

In mobile stations similar to station 31 Figure 8 it is to be understood that there would be two transmitters Figure 16 and two receivers Figure 17.

It is to be understood that each type of service described in connection with Figures 16 and 17 may, where desired, have a single carrier wave frequency individual to the service.

With further reference to Figure 18, the figure shows a receiver 121, with associated sawtooth timing generators and channel control mechanism 118′ similar to mechanism 118 in Figure 16, for either the relay or wayside stations in Figure 8. This receiver is associated with the transmitter 120 Figure 19 and may also be used for similar stations in the radiophone systems shown in Figures 6 and 11.

The antenna 296 receives the carrier wave signals from a distant antenna to a radio frequency amplifier 297. An oscillator 298 reacts with the signals in the first detector stage 299 on the heterodyne principle to produce an intermediate frequency in spaced periods which may be supplied to the intermediate frequency stage 300 where after suitable amplification the intermediate frequency signals may be supplied through the limiter stage 301 to the discriminator 302. After detection in 302 the signals are supplied to the several power amplifiers 303 through 306. Synchronizing signals being of greater amplitude than the message signals are separated in the impulse amplifier stage 307 which is biased to eliminate message signals. From stage 307 the synchronizing signals may be fed over conductors 308 and 309 to the sawtooth timing generators and channel mechanism 118′ to control the generators therein in synchronism with the generators at the pilot station. Two series of timing impulses are supplied from the mechanism 118′ over conductors 310 and 311 to each of the channel selectors.

The message signals supplied to the power amplifiers 303 through 306 are separated into their proper channels by the period of occurrence as determined by the associated channel selectors 312 through 315. The channel selector 312 to select timing periods for the message signals originated in all distant stations may supply timing impulses over conductor 316 to allot the proper periods for the power amplifier stage to be receptive to different groups of message signals from the discriminator 302. From the power amplifier 303 the message signals may be fed over conductor 317 to the transmitter 120. Timing impulses from the channel selector 312 may also be supplied over conductor 318 to the transmitter to control signal group selection.

From the limiter stage 301 the intermediate frequency signals received in spaced periods may also be applied to channel control equipment 319 to produce a voltage impulse for the intermediate frequency signals received in each period. The channel control equipment comprises an amplifier 320 to step up the signal voltage, a full wave rectifier 321 to further amplify and rectify the signal voltages forming single space impulses, and a limiter stage 322 to eliminate ripple from the produced impulses which may be fed over conductor 323 to the transmitter 120 to control the transmission of message signals in the above mentioned groups. The groups are determined by timing impulses over conductor 318.

It is to be understood that the channel selector 312 may control the power amplifier 303 to be conductive for all message signals received from distant stations.

The channel selectors 313 and 314 are for selecting timing impulses to control the amplifiers 304 and 305 over conductors 324 and 325 for reception of position indicating control signals from mobile stations traveling along the route. There is one channel selector such as 313 or 314 for each mobile station in each relay station. The control signals after suitable amplification in the amplifiers 304 and 305 may be fed to the slow acting tubes or stages 326 and 327. These slow acting tubes may maintain output current for a period after the control signals have been cut off so that timing impulses may be selected to transmit signals in periods different than the periods for the control signals. From the stages 326 and 327 potential changes may be applied through the amplifiers 328 and 329 respectively and over conductors 330 and 331 to the transmitter to control the transmission of signals representative of the relay station number or position indicating signals to be more fully explained later.

The channel selector 315 may be located in wayside stations and is for controlling the reception of signals for radiophone calls or messages to the wayside stations. The selector 315 may supply timing impulses over conductors 332 to allot certain assigned periods for the power amplifier 306 to become conductive to certain message signals from the discriminator 302. From the power amplifier 306 the message signals may be supplied through the switch 333 to the loud speaker 334. The switch 333 may connect the speaker 334 to another amplifier similar to 306 in the associated wayside station receiver for the reception of calls in the opposite direction. A busy indicating device 132′ may be furnished in all wayside stations if desired; this device, a cathode ray tube, may be similar to that described above and further explanation is thought to be unnecessary.

It is to be understood that another receiver similar to 121 may be located in each relay and wayside station in Figure 8 for the reception of message and other signals transmitted over another transmission lane.

Again referring to Figure 19 showing a transmitter 120 for either one of the transmitters in the relay and wayside stations shown in Figure 8. This transmitter may also be used for similar stations in the radiophone systems shown in Figures 6 and 11.

The transmitter 120 in the relay and wayside stations may comprise a number of channel selectors 335 through 338 to select periods or channels for different message signals initiated in the associated stations or mobile position indicating control signals initiated in mobile stations traveling the route.

Message signals received from other stations in the system by the receiver 121 may be supplied over conductor 317 to the amplifier 339. From the amplifier 339 the signals may be fed to the reactance modulation amplifier 340, from stage 340 to the oscillator 341 and then applied to the frequency multiplying amplifier 342, thereby, producing high frequency modulated carrier waves of substantially the same frequency as the carrier wave received at the receiver 121 which may be further amplified at the power amplifier 343. This power amplifier may be controlled by the selected group timing impulses over conductor 318 and the channel control impulses over conductor 323 to supply the frequency modulated carrier waves through a number of channels to the antenna 344. The reflector 345 is used to prevent radiation toward the associated receiving antenna 296.

Synchronizing signals from other stations or the pilot station received at the receiver 121 may be supplied over conductors 308′ and 309′ to the amplifier 346. From the amplifier 346 the synchronizing signals or impulses may be supplied through amplifier 340, oscillator 341, amplifier 342 to the power amplifier 347. This power amplifier may be biased to eliminate message signals, but may supply a carrier wave frequency modulated with synchronizing signals to the antenna 344.

From the above description it is to be understood that message signals and synchronizing signals received at the receiver 121 in spaced periods may be re-transmitted at the transmitter 120 in the same periods.

Each of the selectors 335 through 338 may receive over conductors indicated at 348 and 349, two series of timing impulses in spaced periods from the channel control mechanism 118′, one series to select groups of channels and a second series to select a particular channel in a selected group as described above for the terminal and mobile stations.

Alternating signals produced at the generator 350 may be fed to the amplifiers 351 and 352. These amplifiers may be controlled by potential changes applied over the conductors 353, 354 from the channel selectors, and also by potential changes applied over conductors 330 and 331 from the receiver equipment. The spaced signals from the amplifiers 351 and 352 may be supplied through the amplifier 340, oscillator 341, amplifier 342 to the power amplifiers 355 and 356. These latter amplifiers are conditioned by potential changes applied over conductors 357 and 358 from the channel selectors, and also by potential changes applied over conductors 330 and 331 from the transmitter equipment to supply in spaced periods the carrier wave modulated by mobile position indicating signals. Stating it differently, each amplifier 355 and 356 may feed signals in two different recurring periods to the antenna. The signals in one period to indicate the assigned number of the vehicle, and the signals in a second period may be representative of the relay station receiving the position indicating control signals from a mobile station. Therefore, as the mobile station moves along the route and transmits position indicating control signals to the relay stations in succession, signals representative of the different relay stations may be transmitted to indicate the position of the vehicle relative to the fixed stations along the route.

Sound signals developed at the microphone 359 in the wayside station may be fed through the key 360 to the pre-amplifier 361. The amplifier 361 may be controlled by timing impulses over conductors 362 in certain periods selected by the operation of the switches 363 and 364 in the channel selector 337 to supply fragmentary portions of the sound signals from the microphone 359 during the selected periods to the reactance modulator 340. From the modulator 340 the signals may be fed through the oscillator 341, frequency multiplying stage 342 to the power amplifier 365. The amplifier 365 may be controlled through potential changes over conductors 366 to supply modulated carrier wave to the antenna only in the selected periods for messages transmitted in the wayside stations. The key 360 is for transferring the microphone to another amplifier for talking over another transmission lane.

On-course signals produced by the generator 367 may be fed to the amplifier 368 under the control of timing impulses applied over conductors 369 to supply on-course signals in spaced periods through the reactance amplifier 340, oscillator 341, and frequency multiplier 342 to the power amplifier 370. The power amplifier 370 may be under the control of timing impulses over the conductor 371 to supply modulated on-course signals to the antenna 372, in certain spaced periods. The reflector 373 is for directing the on-course signals outward at an angle to the route. The on-course signals may be transmitted from each relay on wayside station but are not transmitted from one relay station to another relay station. These signals are intended to give a visual indication in the mobile station when flying on the proper side of the route. The second transmitter in each relay and wayside station may transmit on-course signals in a different period and reflected in the opposite direction.

In Figures 18 and 19 the keys 333 and 360 may be the key 125 in Figure 8, and the speaker 334 and microphone 359 may be the speaker and microphone 124 in Figure 8.

From the above description it has been shown that signals may be received over one channel and representative signals may be delayed and transmitted over other channels.

Reference is made to Figures 20 through 23 which shows circuit diagrams and apparatus previously illustrated by the reference numeral 118, for producing two sets of sawtooth waves and channel control or timing mechanism to produce a series of timing impulses for each set of the sawtooth waves. The timing impulses may be utilized to control the transmission of fragmentary portions of message signals in spaced periods of time. One set of the equipment Figures 20 and 21 may be located in each station of any of the radiophone communication systems shown in Figures 6, 8, and 11 for controlling the transmission and reception of message signals. All the equipment 118 in any system may be synchronized by synchronizing impulses produced in the pilot's or dispatcher's station and transmitted or relayed to all the other stations in the system. The sawtooth generators and channel control mechanism shown in the block diagram for all stations in Figures 6, 8, and 11 may be similar to the equipment 118.

The channel control mechanism may comprise two cathode ray tubes each having a number of anodes arranged in one or more rows adjacent the inner screen surface of the tube, an electron ray directed toward the anodes and deflecting plates for deflecting the electron ray over the anodes. These cathode ray tubes are very similar to the conventional tube except that there are a number of spaced plates or anodes aligned near the inner screen surface of the tube. Each anode may be connected to a load resistor to produce timing impulses as the electron ray is deflected over the anodes.

The units or horizontal sawtooth wave generator Figure 20 for producing a series of sawtooth timing waves may comprise a condenser 375 charged through a variable resistor 376 from a source of positive potential as indicated. When the condenser 375 becomes charged the sawtooth wave in the plate circuit of tube 377 is impressed on the grid of multi-unit tube 378, through an adjustable contact on the resistor 379 for adjusting the amplitude of the sawtooth waves. The sawtooth potentials developed at the load resistors 380 and 381 may be impressed on the deflecting plates 382 and 383 of a cathode ray tube 384 for deflecting the electron ray across the several anodes. The sawtooth potentials may also be applied over conductors 290 to the cathode ray tube 132 Figure 17. The tube 384 is shown as having thirteen anodes, each of which may be connected to a load resistor; for instance, the first anode 385 may be connected to the load resistor 386 and the fourth anode 387 may be connected to the resistor 388. The first ten anodes may produce units timing impulses or timing impulses for the unit digit in a numbered channel by the deflection of the electron ray over the anodes. These timing impulses may be applied over conductor 390 to the conductors numbered 197 and 266 in Figures 16 and 17, and conductors numbered 310 and 349 in Figures 18 and 19. The function of the eleventh anode will be explained later. As the electron ray is deflected across the twelfth anode an impulse may be applied through switch 391 and over conductor 392 to the grid of amplifier 393. From amplifier 393 the impulse may be impressed on the grid of trigger tube 377 causing this tube to become conductive to discharge condenser 375, thereby causing the backward deflection of the electron ray in tube 384. In a pilot station the switch 394 would be in its non operated position as shown in the drawings in order to supply the trigger impulses over conductor 242 to the preamplifier 244 Figure 16 for transmission to the distant or satellite stations in the system.

In mobile, relay and other satellite stations synchronizing signals would not be produced in the equipment 118 for modulating the carrier wave. But synchronizing signals or impulses received from the pilot station through the pulse amplifiers, such as 261 Figure 17 and 307 Figure 18, may be applied over conductor 395, shown as conductors 263 and 308 Figures 17 and 18, through switch 394 in its operated position to the grid of trigger tube 377 to discharge the condenser 375 and to cause the backward movement of the electron ray as described above.

To prevent the transmission of message signals from a mobile station or satellite stations, that may be turned on and off, until the deflection of the electron ray in the satellite station is in unison with the movement of the electron ray in the pilot station, I provide automatic deflection control apparatus 396 to adjust the charging rate of condenser 375 to bring the full deflection of the electron ray at the satellite station in unison with the electron ray at the pilot station before the central amplifier in the transmission line becomes conductive to message signals.

In the master or pilot station the twelfth anode circuit may initiate the trigger and synchronizing impulses; therefore, the electron rays in the cathode ray tubes for mobile and other satellite stations should move across their twelfth anode at the same time. Switch 391 in satellite stations may be operated so that the impulses produced in the twelfth anode circuit or at load resistor 397 may be impressed on the grid of tube 398. From tube 398 the impulse may be fed to the coil 399 in the transformer 400. Synchronizing impulses received over conductors 395 and 401 may be fed to the coil 402. The two coils 399 and 402 are wound so that the magnetic flux produced by the two impulses will be in opposite directions which is the proper condition when the electron rays at the pilot and satellite stations are moving in unison.

Assuming that tube 384 is in a mobile station and also that the rate of deflection of the electron ray is slightly slower than the deflection rate at the pilot station, then a received synchronizing impulse may produce an impulse in the secondary winding of transformer 400 to impress a positive potential on the control grids in slow acting tubes 403 and 404. In tube 403 the positive impulse on the control grid causes current to flow through the phosphorescent anode 405, which may be coated with luminescence material of rather slow decay, causing it to glow for a short period of time after the cut off of the grid impulse. Glow from the anode 405 causes current to flow through the photo cell in tube 403 and the resistor 406. The voltage drop at resistor 406 may be applied over conductor 407 to the signal control amplifier 208 in the mobile transmitter Figure 16, thereby, rendering the latter amplifier non-conductive to message signals. The positive impulse on the control grid of tube 404 causes an increase in current flow through the anode 408, which is similar to the anode 405, causing it to become brighter, thereby increasing the current through the photo cell in tube 404 to increase the potential applied over conductor 409 to the control grid in tube 410, whereby, the current through tube 410 to the condenser 375 is increased to increase the velocity of the electron ray in tube 384. Increasing the speed of deflection may cause the impulse through coil 399 to occur at the same instant as the impulse from the pilot station passes through coil 402, in which case the potential on conductor 407 becomes more positive to cause the control amplifier 208 Figure 16 to become conductive to message signals.

Now assume that the electron ray in tube 384 is operating at a higher velocity than the velocity of the electron ray in a similar tube at the pilot station. Then a positive impulse initiated at resistor 397 may through the tube 398 be applied through coil 399 to produce an impulse in the transformer secondary winding which may impress a positive impulse on the control grid in slow acting tube 411, and a negative impulse on the control grid in tube 404. The positive impulse on the grid of tube 411 causes an increase in current flow through the anode 412, which is similar to the anode 405, causing it to glow. Glow from the anode 412 causes current to flow through the photo cell in tube 412 and the common resistor 406. The voltage drop at resistor 406 may be applied over conductor 407 to the signal control amplifier 208 in the mobile transmitter Figure 16, to render the latter amplifier nonconductive to message signals. The negative impulse applied to the grid of tube 404 may cause less current through the tube 410 to lower the charging rate of condenser 375, whereby, the velocity of the electron ray in tube 384 is reduced.

It is to be understood that the luminescent coated anodes in tubes 403, 404, and 411 by their relatively slow rate of decay may maintain substantially constant current flow through their associated photo cells when actuated by successive synchronizing impulses.

From the above description it has been shown that regardless of whether the deflection rate is slow or fast the automatic control mechanism 396 may automatically regulate the velocity of the electron ray at the satellite station to bring it in unison with the movement of the electron ray at the pilot station.

The last or thirteenth anode in tube 384 for the satellite stations is used to initiate trigger impulses in case of no synchronizing signals being received due to fading or the pilot station not transmitting. The voltage drop produced in load resistor 413 may be supplied through switch 414, conductor 392, to the grid of tube 393 causing trigger tube 377 to become conductive as explained above. The control grid in tube 384 may be supplied with a negative impulse over conductor 415 each time a synchronizing signal is received over conductor 392 or conductor 395 for substantially extinguishing the electron ray during its backward movement.

The tens or vertical sawtooth wave generator for producing a series of sawtooth timing waves may comprise a condenser 416 Figure 21 charged each time that the electron ray in tube 384 impinges its eleventh anode to produce a voltage drop at resistor 417. This voltage drop may be impressed on the grid 418 in tube 419 over the conductor 420 to produce a positive impulse at grid 421, whereby the condenser 416 may be charged for the duration of one synchronizing impulse through the tube 419 and a variable resistor 422 from a source of positive potential as indicated. As the condenser 416 becomes charged, under the control of the deflection of the electron ray in tube 384, the stepped voltage wave in the plate circuit of trigger tube 423 is impressed on the grids of multi-unit tube 424 through the resistor 425. The stepped waves developed at the load resistors 426 and 427 may be impressed on the deflecting plates 428 and 429 of the cathode ray tube 430 for deflecting or jumping the electron ray step by step from one anode to another anode. The changing potentials at the load resistors 426 and 427 may also be applied over conductor 291 to the cathode ray tube 132 Figure 17. The tube 430 is shown as having thirteen anodes, each of which may be connected to a load resistor. The first ten anodes may produce tens timing impulses or timing impulses for the tens digit in a two digit numbered channel by the deflection of the electron ray over the anodes. These timing impulses may be applied over conductor 432 to the conductors numbered 196 and 267 in Figures 16 and 17, and conductors numbered 311 and 348 in Figures 18 and 19.

In the tube 430 each of the first ten plates or anodes 433 may have a narrow slot 434, as illustrated, near the electron ray leaving edge in Figure 22, and a common secondary plate or anode 435 comprising small extending portions disposed back of the slots from the view at the cathode. The secondary anode 435 may be connected to a source of positive potential through resistor 436 which may be of a higher voltage than the voltage on anodes 433.

As the electron ray in tube 430 is deflected in steps or jumped to each anode 433 as a result of impulses occurring during each deflection of the electron ray in tube 384 the charging current through tube 419 may be cut off between impulses. However, the condenser 416 may be further charged through tube 437 which may be biased to charge slowly the condenser 416 through the tube and variable resistor 438 to deflect at a relatively slow rate the electron ray over a plate 433 until it reaches a slot 434, thereby, producing a voltage drop in resistor 436 which may be applied over conductor 439 to the grid of tube 437, thus preventing further deflection of the electron ray until movement is initiated by the voltage drop at resistor 417.

In the master or pilot station the eleventh anode circuit in tube 430 may initiate the tens or vertical trigger or synchronizing impulses in the following manner; as the electron ray is deflected to the eleventh anode an impulse may be produced at load resistor 440 and applied over conductor 441 to the grid of amplifier 442. From amplifier 442 the impulse may be impressed on the grid of trigger tube 423 causing this tube to become conductive to discharge condenser 416, thereby causing the backward deflection of the electron ray in tube 430. In a pilot station the switch 443 would be in its non operated position as shown in the drawings in order to supply the synchronizing signals over conductor 243 to the preamplifier 244 Figure 16 for transmission to the distant or satellite stations in the system.

In the satellite stations tens synchronizing signals would not be transmitted to other stations. But synchronizing signals may be received from the pilot station through the pulse amplifiers such as shown in Figures 17 and 18, and applied over conductor 444, shown as conductors 264 and 309 Figures 17 and 18, switch 443 to the grid of trigger tube 423 to discharge the condenser 416 and to cause the backward movement of the electron ray as described above. Synchronizing signals may be applied over conductors 446 and 294 to the camera-control mechanism 293 Figure 17. Therefore, the shutter and film may be operated at completion of each frame. Tens synchronizing signals received over conductor 444 or in the pilot stations those initiated at load resistor 440 may be applied over conductors 446 and 477 to trigger tube 377, thereby, causing the backward deflection in tube 384 each time the electron ray in tube 430 is deflected backward. The switch 445 may be opened in the satellite stations so that local impulses may be initiated in the twelfth anode circuit to care for the absence of signals over conductor 444.

The tens or vertical synchronizing signal initiated at load resistor 440 triggers both tubes 377 and 423. This signal caused by the electron ray in tube 430 impinging the eleventh anode, which may occur before the units or horizontal synchronizing signals is initiated at load resistor 397. Therefore, only one synchronizing impulse occurs between frames or at the end of each vertical timing wave.

From the above description it has been shown that each step movement of the electron ray in tube 430, producing the channel group timing impulses, is positively controlled by each full deflection of the electron ray in tube 384 or after all individual channel timing impulses in a group have been initiated.

The electron ray in tube 430 may be fixed in a direction perpendicular to the row of anodes by positive potential applied through load resistors 448 and 449 to the deflecting plates 450 and 451.

The units cathode ray tube 384 may have two rows of plates or anodes with both rows having the same number of plates or either row may be provided with a greater number of anodes as shown at 452, Figure 23. The last three anodes in each row may be of like length and spacing with the eleventh, twelfth, and thirteenth plates in one row connected to similar plates in the second row so that the electron ray deflected over either row of plates may cause the trigger and synchronizing impulse circuits to function as described above.

Assume that the first three groups of channels on the first three lines in a period of time frame such as illustrated in Figure 15 are for ten channels each and beginning with the fourth line it is desired to have a greater number of channels or periods in each line or group; then the voltage drop developed at load resistor 452 in the fourth anode circuit of tube 430 may be applied over conductor 453 to the grid 454 in tube 455 to produce a positive impulse at grid 456, whereby the condenser 457 may be charged for the duration of one timing pulse through the tube 455 from a source of positive potential as indicated. As the condenser 457 becomes charged the increasing voltage in the plate circuit of trigger tube 458 is impressed on the grids of multi-unit tube 459 through the resistor 460. The potentials developed at the load resistors 461 and 462 may be impressed on the deflecting plates 463 and 464 for deflecting the electron ray to the second row of plates. Each of the anodes in the second row may be connected to individual load resistors (not shown). The grid 456 may be biased for a very small current drain to maintain the condenser 457 partially charged. At the end of each forward deflection in the tens tube 430 the trigger impulses may be applied over conductor 446, as described above, to the grid of trigger tube 458, thereby, rendering this tube conductive to discharge the condenser 457. If only intermediate lines in the period of time frame are for a greater number of anodes or channels, then at any line where it is desired to again have only ten channels per group or per anode in tube 430, such as ninth anode, the voltage drop developed at load resistor 465 may be applied over conductor 466 to the grid 467 in tube 458, whereby, a positive impulse may be applied to its first control grid to render the tube conductive, discharging condenser 457 and returning the electron ray to the first row of contacts.

From the above description it is to be understood that a group of channels may comprise two rows of anodes for ten channels each and a second group in the same time period frame may comprise two additional rows of anodes for ten channels each.

Figure 24 shows channel apparatus and associated circuits that may be employed to condition the radio transmitter for facsimile or other message signal transmission over selected channels.

The channel selector 194 and other apparatus may be similar to that shown in Figure 16 for radiophone conversations and similar parts have like reference numerals.

The transmitter may be controlled by channel selector 194 to transmit signals either modulated or a carrier wave during selected periods. The units and tens channel selecting switches 198 and 199 respectively may be adjusted to the desired channel number to obtain the proper timing impulses over conductors 339 and 431 from Figure 20, and as shown in the drawings the switches are set for the first channel in group one or channel number eleven. Next the microphone may be removed from the switch hook 467 to complete a circuit for the timing impulses to the grids 468 and 469 in tubes 470 and 471. These tubes are biased to permit current flow to maintain the grids 472 and 473 in tubes 214 and 216 negative until such time that the selected tens and units timing impulses occur. The timing impulses applied at the same time to the grids 468 and 469 may block current through tubes 470 and 471, whereby, grids 472 and 473 become more positive. Each time that the selected timing impulses received through both the tens and unit switches occur at the same time tubes 214 and 216 may become conductive to signalling potentials and message signals applied to their control grids.

The channel selector Figure 24 may be similar to the selectors 193, 195, and 225 Figure 16 and selectors 337 and 338 Figure 19, except that the switch hook may be replaced with a two position lever key in selectors 193, 195, and 225, and in the selectors 195 and 338 the channel selecting switches would be eliminated since the message signals for the terminal city name, and on-course signals are transmitted over certain fixed channels.

The microphone 211′ may be connected through the ringing key 212 and the springs associated with jack 218 to the control grid of the preamplifier 214. The jack may be employed in terminal and wayside stations for interconnecting to telephone lines through a cord circuit to be explained more fully later. In mobile stations the microphone may be connected to the control grid of tube 214 eliminating jack 218. Other types of equipment may be connected to the control grid of preamplifier 214, such as the facsimile mechanism 260 and position indicating signal device not shown.

Figure 25 shows channel apparatus and associated circuits that may be employed to condition the receiver for the reception of facsimile or other message signals over certain or selected channels.

The channel selector 271 and other apparatus may be similar to that shown in Figure 17 for radiophone conversations and similar parts have like reference numerals.

The receiver may be controlled by the channel selector 271 for the reception of message signals through certain channels or over selected channels. The tens and units channel selecting switches 268 and 269 may be adjusted for any channel number to obtain the proper timing impulse from Figure 20 over conductors 432 and 390 for the reception of a desired message. The switches 268 and 269 are only used in the receiver when it is desired to have more than one call channel or call number. As shown in the drawings the tens and units switches 268 and 269 are set for the second channel in group one or channel number twelve which may be the station call number. The receiver is in standby condition at all times and timing impulses from Figures 20 and 21 may be applied through the switches 268 and 269 to the grids 474 and 475 in tubes 476 and 477. These tubes are biased to permit current flow to maintain the grids 478 in tube 258 negative until such time that the tens and units timing impulses applied to the grids 474 and 475 occur at the same time to block current through tubes 476 and 477, whereby, the grids 478 become more positive rendering the tube 258 conductive to low signaling potentials or message signals.

The channel selectors Figure 25 may be similar to the selectors 270, 272, and 273 Figure 17, and selectors 312 and 315 Figure 18 except the channel selecting switches in selectors 273, 312, and 315 may be omitted since the message signals are always received over the same channels and in selectors 312 and 273 units timing pulses are not used since all message signals in a number of groups are transferred to the transmitter.

Signals to notify an attendant of a waiting call may be initialed at the transmitter equipment Figure 24 by the operation of key 212. The receiver may intercept these signals which may be applied to a bell or the loud speaker 280 connected through the key 279 and the springs associated with the jack 278 to the output circuit of the power amplifier 258. The jack may be employed in terminal and wayside stations for interconnecting to telephone lines through a cord circuit. In mobile stations the loud speaker may be connected in the power amplifier output circuit eliminating the jack 278. Other types of equipment may be connected to the output circuit of tube 258, such as the facsimile mechanism 275. The answering jack 278 may be located near or in the same switchboard position with the calling jack 218 Figure 24, to facilitate handling of calls to and from telephone offices. The terminal stations may be located in telephone offices to facilitate handling telephone calls.

Figure 26 shows a cord circuit for interconnecting radiophone stations with telephone lines and comprises a radio station calling plug 479 for removably connecting to jack 218 Figure 24, a radio station answering plug 480 for removably connecting to jack 278 Figure 25 and another jack 481 for removably connecting the cord circuit to a telephone line jack 482. The telephone line 483 terminating in the jack 482 may be provided with a conventional supervisory signal and line and cutoff relays. Battery may be supplied from a telephone office over line 483, jack 482, plug 481, relay 484, plug 479, and jack 218 and transformer winding Figure 24 to transmit message signals to a radio station. Message signals from the radio station may be fed from jack 278 Figure 25 through plug 480. The supervisory relay 484 may be deenergized when the telephone subscriber disconnects notifying the radio station attendant by the lighting of a lamp.

Figure 27 shows channel apparatus and associated circuits that may be employed to condition the radio transmitter in aircraft stations for altitude indicating signals. The altitude indicating signals being transmitted over different channels in a group depending upon the altitude of the aircraft.

The channel selector 224 and other apparatus may be similar to that shown in Figure 16 for altitude indicating and similar parts have like reference numerals.

The transmitter may be controlled by channel selector 224 to transmit signals in two different periods in a channel group. The first period or channel in a group may be representative of the aircraft identification number, or the group channel number and signals may be repeatedly transmitted through this channel. The second period may be variable or any other channel in the group. The tens switch 226 may be adjusted to the desired channel group which in the instant case may be the number seven. The units switch may comprise an altimeter 227 of conventional type modified by a commutator ring 485 and commutator bars 486 so that the instrument pointer 228 in the form of a brush may contact both the ring and segments as it is rotated in accordance with the altitude of the aircraft. With the aircraft grounded, brush 228 would not make contact with any commutator segment 486. The conductors 389 are connected to the commutator segments so that as brush 228 is rotated timing impulses may be selected for successive channels in the group.

The key 487 may be operated to complete a circuit for the timing impulses to the grids 488, 489, and 490 in tubes 491 and 492. Grid 488 may be biased to permit current flow through tube 491 to maintain the grids 493 in tube 230 and the grids 494 in tube 233 negative until such time that a timing impulse occurs for the seventh group. Grid 489 may be biased to maintain the grid 495 in tube 230 and grid 496 in tube 233 negative until a timing impulse occurs for the first channel in the seventh group. Grid 490 may be biased to maintain the grid 497 in tube 230 and the grid 498 in tube 233 negative until a timing impulse occurs on the segment 486 that the brush 228 is contacting. Therefore, as timing impulses occur in the first period in the seventh group the right unit of tube 230 becomes conductive to signals from the generator 232 and right unit of tube 233 becomes conductive to modulated signals for indicating the vehicle numbers on the cathode ray tube screen at the receiving stations. As timing impulses occur in any other automatically selected period by the brush 228 the left unit of tubes 230 and 233 become conductive to signals from the generator 232 for indicating the altitude on cathode ray tube screens at the terminal, wayside, and mobile stations in the communication system.

In connection with Figures 20 through 24 it was explained how a group of channels could be enlarged from ten to twenty or more channels by using a double row of anodes in the electronic timing switch, which of course would require all stations in the system to use the same channel groups. It may be desired to operate certain mobile stations on different routes having different arrangements of channel groups; therefore, I may provide in the individual selector 224 an additional tube 499 for each set or additional group of ten channels to be added to the main group. As pointed out above the channel selecting switch 226 is set to supply the timing impulses for the seventh group to the grid 488 of tube 491. To add ten more channels to this group the timing impulses for the eight group of channels may be impressed on the grid 500 in tube 499 and after a phase reversal in this tube the timing impulses may be applied to the grid 488. Therefore, the tube 491 is under the control of both the seventh and eighth group timing impulses to increase the channels for indicating higher altitudes.

Figure 28 shows channel apparatus and associated circuit in the relay and wayside stations for the reception of control signals in certain periods from mobile stations to control the transmission of mobile position indicating signals from the transmitter apparatus Figure 29.

The channel selector 313 and other apparatus may be similar to that shown in Figure 18 for the reception of mobile position control signals and similar parts have like reference numerals.

The receiver is in stand by condition and it may be controlled by the channel selector 313 for the reception of mobile position control signals over a certain channel determined by the timing impulses applied to the grids of tubes 501 and 502. The assigned channel may be the first channel or period in group seven. The group timing impulses applied to the grid of tube 501 may interrupt or decrease the current through the tube 501, whereby, the grid 503 in tube 304 may become more positive. The units timing impulses applied to the grid of tube 502 may interrupt or decrease the current through the tube 502, whereby, the grid 504 in tube 304 may become more positive. Therefore, the tube 304 may become conductive to motor control signals from the discriminator 302 in the first period in the seventh group of channels. After suitable amplification in tube 304 the signals may be applied to the control grid 505 in slow acting tube 326. This slow acting tube described in a prior application may comprise an anode 506 provided with a coating of luminescent material of relatively slow decay so that the control signals applied to the grid 505 may cause a steady glow from the anode for a period of time after signal cut off to actuate the photo cell 507 inside the same envelope. Therefore, a mobile station, such as Figure 16, transmitting mobile position control signals in spaced periods of time or over channel number seventy-one may cause the anode 506 to glow continuously. Current through the photo cell 507 causes grid 508 to become sufficiently positive for current flow through the first unit of tube 328 to impress a negative potential on grid 509 for interrupting current flow through the second unit of tube 328. Whereby, conductor 510 to the channel apparatus Figure 29 becomes more positive during the reception of mobile position control signals.

Figure 29 shows channel apparatus and associated circuits that may be employed to condition the transmitter in the relay and wayside stations for transmitting mobile position indicating signals under the control of the apparatus in Figure 28. The position indicating signals may be transmitted over different channels depending upon the relay station receiving mobile position control signals from a mobile station.

The channel selector 335 and other apparatus may be similar to that shown in Figure 19 for controlling transmission of mobile position indicating signals and similar parts have like reference numerals.

The transmitter in the relay or wayside stations may be controlled by channel selector 335 to transmit signals in two different periods in a channel group. The first period or channel in a group may be representative of the mobile identification number, or the group channel number and signals may be repeatedly transmitted through this channel. The second period may be representative of the relay or wayside station number and would be a different period in each relay station. Figure 29 may be in the second relay station on the route for a mobile station which may be assigned the fourth group of channels. Tube 511 is normally biased for current flow to maintain the grids 512 in tube 351 and the grids 513 in tube 355 negative until current flow is interrupted in tube 511 by group or tens timing impulse for the fourth group of channels from conductors 432 which are impressed on the grids 514. The left unit of tube 515 is normally biased for current flow to maintain the grid 516 in tube 351 and grid 517 in tube 355 negative until units timing impulses for the first channel in the fourth group may be applied to the grid 518 in tube 515. The right unit of tube 515 is biased for current flow to maintain the grid 519 in tube 351 and grid 520 in tube 355 negative until units timing impulses for the third channel in the fourth group may be applied to the grid 521 in tube 515. The grids 522 and 523 in tubes 351 and 355 may be positive from conductor 510 as long as mobile position control signals are being intercepted. Therefore, as timing impulses occur in the first period in the fourth group the right unit of tubes 351 and 355 become conductive to signals from the generator 524 for transmitting the generator signals to indicate the mobile number. As timing impulses occur in the second period in the fourth group the left unit of tubes 351 and 355 become conductive to signals from the generator 524 for transmitting the generator signals to indicate the relay number or the position of the mobile station relative to the relay stations on cathode ray tube screen at the terminal, wayside, and mobile stations, in the communication system.

It is to be understood that the selectors in Figures 28 and 29 may have access to a greater number of channels as explained in connection with Figure 27, which would also require the position indicating channel selectors in Figures 18 and 19 to be arranged in a similar manner.

Figure 30 shows diagrammatically a channel selector with apparatus and associated circuits that may be used in the radio aircraft receiver Figure 17 for the reception of obstacle signals from a number of transmitting stations on top of high buildings and mountains to provide an audible or visual signal. This selector may then be manually adjusted to select the signals from only one transmitter and thereafter the directional antenna may be rotated to give the direction of the transmitting station relative to the aircraft in order to aid the pilot in zero visibility to locate obstacles in his flight path.

Each fixed high obstacle radio station mounted on a high building or mountain may be similar to the transmitter and receiver Figures 17 and 16 except that only one selector similar to 195 would be provided to repeatedly transmit in a certain period signals representative of the name of building, height, and city. These obstacle radio stations may be under control of synchronizing signals from the terminal or master pilot station. Since each obstacle radio station transmits the name of building the pilot may determine by rotating antenna his location relative the obstacle transmitting stations.

The selector 525 may be considered as a modification of the receiver Figure 17 or it may be operated as a separate receiver for a different carrier wave frequency but utilizing the common timing impulses produced in Figure 20. For simplicity the obstacle channel selector will be described as a modification of the receiver in Figure 17 and the apparatus has been connected to show association with the mobile receiver.

In Figure 30 it is assumed that the third group of channels have been assigned for obstacle detection signals from a number of transmitters on tall buildings in the larger cities. The grid 526 of tube 527 is biased for current flow to maintain the grids 528, 529, and 530 in tubes 531, 532, and 251 negative until current flow is interrupted in tube 527 by group timing impulses for the third group of channels. These impulses from conductors 432 may be impressed on the grid 526 to render tube 531 conductive to obstacle signals from any channel in the third group, and also to render the right unit of radio frequency stage 251 conductive to signals from the directional antenna indicated at 533 during the several periods in the third group of channels. Therefore, obstacle signals received over any channel in the third group may produce a visual or audible alarm at 534. The right unit of tube 527 is normally biased to cut off, but the timing impulses on grid 526 produces plate current in the right unit to make the grid 535 more negative, thereby preventing reception of signals from antenna 250 during the time that the receiver may be receptive to signals from antenna 533.

The pilot in response to an alarm may rotate the switch 536 to apply the units timing impulses in succession to the grid of tube 537 to render tube 532 conductive in successive periods for selecting a single channel or period from which obstacle signals representative of a building name and city are being received; then he may rotate the antenna 533 to the point where the signals reproduced in the loud speaker 538 appears to be the loudest to indicate the direction to the obstacle transmitting station and to determine whether to increase his altitude or steer to one side.

In the various circuits shown and described I have simplified the drawings by indicating the source of potential by a sign. Also, I have omitted the heater filaments for the various tubes, but it will be understood that such filaments are necessary.

The embodiments of the invention which have been given herein are illustrations of the method by which the various features may be accomplished and the principles involved. It is to be understood that the invention contained herein is capable of embodiment in many other forms and adaptations, without departing from the spirit of the invention and the scope of the appended claims.

While I have described my invention as a wireless system, it is to be understood that the principles involved may be equally applicable to carrier system using metallic conductors for increasing the number of simultaneous messages.

Having thus described my invention, I claim:

1. In a radio communication system, a plurality of numerically designated repeater stations spaced along a conveyance route, a first mobile station comprising a first transmitter and a receiver in a vehicle traveling said route, means associated with said mobile station to produce a plurality of series of timing pulses, each of the said series of timing pulses for a different pulse communication channel, means associated with said transmitter including a pulse channel selector having a member capable of being rotated to select one of said series of pulses for a pulse communication channel for signal transmission, means associated with said first transmitter including a first amplifier responsive to the selected series of pulses to cause first signals to be transmitted over the selected channel to said repeater stations in succession as the said mobile station moves along said route, means associated with said first transmitter including another pulse channel selector to select a second one of said series of pulses for a second pulse communication channel, a second amplifier responsive to said second series of pulses to cause control signals to be transmitted over said second channel to said repeater stations in succession, a space transmitter associated with each of the said repeater stations to retransmit the said signals received thereat, means at each of the said repeater stations to produce a plurality of trains of timing pulses in synchronism with said series of timing pulses, a different train of said timing pulses for a different repeater station identification pulse communication channel with the indentification pulse communication channel for each repeater station designated to correspond to the number of such station, means at each of the said repeater stations including a pulse delay circuit responsive to said control signals to cause said space transmitters to transmit signals over said identification channels in succession as said vehicle moves along said route, means in said mobile station including a scanning device responsive to the said signals for visually indicating all the channels over which signals are being transmitted, and photographic means, associated with said scanning device, coacting with said first mentioned means for making a record of the visual indications on said scanning device.

2. In a radio communication system, a plurality of numerically designated repeater stations spaced along a predetermined route, a first mobile station comprising a first transmitter and a receiver in a train traveling said route, means associated with said mobile station to produce a plurality of series of timing pulses, each of the said series of timing pulses for a different pulse communication channel, means associated with said transmitter including a pulse channel selector having a manually operable member capable of being rotated to a first position to select a first one of said series of pulses for a pulse communication channel for message signal transmission to a second mobile station in said train, or rotated to one of its other positions to select another one of said series of pulses for a pulse communication channel for message signal transmission to a distant base station, means associated with said first transmitter including a first amplifier responsive to the selected series of pulses to cause signals to be transmitted over the selected channel to said repeater stations in succession as the train moves along said route, means associated with said first transmitter including another pulse channel selector to select a second one of said series of pulses for a second pulse communication channel, a second amplifier responsive to said second series of pulses to cause control signals to be transmitted over said second channel to said repeater stations in succession, a space transmitter associated with each of the said repeater stations to retransmit the said signals received thereat, means at each of the said repeater stations to produce a plurality of trains of timing pulses in synchronism with said series of timing pulses, a different train of said timing pulses for a different repeater station identification pulse communication channel with the identification pulse communication channel for each repeater station designated to correspond to the number of such station, means at each of the said repeater stations including a pulse delay circuit responsive to said control signals to cause said space transmitters to transmit signals over said identification channels in succession as said train moves along said route, means in said mobile station including a scanning device responsive to the said signals for visually indicating all of the channels over which signals are being transmitted, and photographic means associated with said scanning device, coacting with said first mentioned means for making a record of the visual indications on said scanning device.

3. In a radio communication system, a plurality of numerically designated repeater stations spaced along a predetermined route, a first mobile station comprising a first transmitter and a receiver in an airplane traveling said route, means associated with said mobile station to produce a plurality of series of timing pulses, each of the said series of timing pulses for a different pulse communication channel, means associated with said transmitter including a pulse channel selector having an altimeter controlled member to select one of the said series of timing pulses according to the altitude at which said airplane is flying, thereby selecting a pulse communication channel for signal transmission, means associated with said first transmitter including a first amplifier responsive to said selected series of pulses to cause signals to be transmitted over the selected channel to said repeater stations in succession as said airplane moves along said route, means associated with said first transmitter including another pulse channel selector to select a second one of said series of pulses for a second pulse communication channel, a second amplifier responsive to said second series of pulses to cause control signals to be transmitted over said second channel to said repeater stations in succession, a space transmitter associated with each of the said repeater stations to retransmit the said signals received thereat, means at each of the said repeater stations to produce a plurality of trains of timing pulses in synchronism with said series of timing pulses, a different train of said timing pulses for a different repeater station identification pulse communication channel with the identification pulse communication channel for each repeater station designated to correspond to the number of such station, means at each of the said repeater stations including a pulse delay circuit responsive to said control signals to cause said space transmitters to transmit signals over said identification channels in succession as said airplane travels said route, means in said mobile station including a scanning device responsive to the said signals for visually indicating all of the channels over which signals are being transmitted, and photographic means, associated with said scanning device, coacting with said first mentioned means for making a record of the visual indications on said scanning device.

4. A communication system as claimed in claim 1 wherein there is a plurality of other mobile stations traveling said route, each of the said other mobile stations transmitting control signals over pulse communication channels different for each mobile station, said control signals controlling certain of said space transmitters to transmit signals over other repeater station identification pulse communication channels designated to correspond to the number of the repeater station receiving said control signals to visually indicate on said scanning device the different channels utilized, thereby showing in said first mobile station the relative position of each mobile station traveling said route.

5. In a radio station comprising a receiver and a transmitter, a pulse generator associated with said station to produce recurring timing pulses, certain of said recurring timing pulses controlling said receiver to receive message signals for a number of different messages during different recurring periods of time, each recurring period being in accordance with a different recurring timing pulse, means associated with said station to produce a carrier wave, means to modulate said carrier wave with said message signals, means including an amplifier rendered conductive in response to said certain timing pulses to intermittently transmit said modulated carrier wave, and means associated with said station including a signal delay circuit responsive to signals from one of said messages to cause other signals to be transmitted during another recurring period for station identification.

6. A radio station comprising a transmitter and a receiver in an airplane traveling a route, a pulse generating device associated with said station to produce a plurality of recurring timing pulses, an altimeter to select certain of said recurring timing pulses according as said airplane changes altitude to cause said transmitter to transmit signals during different recurring periods, and means associated with said receiver responsive to other of said recurring pulses to receive message signals from a distant station to inform the pilot in said airplane of an obstacle in its flight path by reproduction of said message signals to give the name, height and location of said obstacle.

7. A radio station comprising a transmitter and receiver, a pulse generator to produce recurring timing pulses and synchronizing signals, amplifier means in said transmitter to control the transmission of said synchronizing signals, first recurring timing pulses controlling said receiver to receive message signals over communication channels comprising first recurring pulses of a carrier wave, second recurring timing pulses controlling said receiver for the reception of vehicle position indicating signals over channels comprising second recurring pulses of said carrier wave, a busy channel and vehicle position indicating device responsive to said message signals and said vehicle position indicating signals for visually registering thereon all busy channels for communication and vehicle position, and photographic means under control of certain of said synchronizing signals to repeatedly record said registry.

8. In a communication system, a plurality of numerically designated radio relay stations spaced along a predetermined airplane route and between terminal radio stations, each of the said terminal stations comprising an aircraft position indicating cathode ray tube, an aircraft flying over said route provided with a mobile radio station, means to transmit interrupted signals between said mobile station, moving with said aircraft, and said relay stations in succession, means to receive said signals at the different said relay stations in succession as said aircraft moves along said route, means in each relay station to produce recurring timing pulses, at each of the said relay stations means including an electron device responsive to said interrupted signals to produce an uninterrupted repeater station signal, at each of the said relay stations means including a pair of gate amplifiers under control of different said timing pulses and said uninterrupted station signal to cause other signals to be transmitted in two different recurring periods of time, a first recurring period from each relay station for said airplane identification and a different recurring period from each relay station according to the position of each relay station along said route or according to the relay station numbers, means at each of the said terminal stations to receive said other signals for causing said cathode ray tubes in said terminal stations to indicate the position of said airplane relative to said relay stations.

9. In a communication system, a chain of radio relay stations spaced along a predetermined automobile route and between terminal radio stations, each of the said terminal stations comprising an automobile position indicating device, an automobile traveling over said route provided with a mobile radio station, means to transmit interrupted signals between said mobile station, moving with said automobile, and said relay stations in succession, means to receive said signals at the different said relay stations in succession as said automobile moves along said route, means in each relay station to produce recurring timing pulses, at each of the said relay stations means including a pair of gate amplifiers under control of different said timing pulses and said interrupted signals to cause other signals to be transmitted in two different recurring periods of time, a first recurring period from each relay station for said automobile identification and a different recurring period from each relay station according to the position of each relay station along said route, means at each of the said terminal stations to receive said other signals for causing said device to indicate the position of said automobile relative to the said relay stations.

10. A communication system as claimed in claim 2 wherein the said base station at one terminal of said route includes a receiver to receive all of said signals through one of the said repeater stations, a telephone wire line extending from said base station, for said line a telephone set having a receiver for the reception of signals and means including a cord circuit to transmit said message signals over said telephone wire line.

11. In a radio communication system, a plurality of radio relay stations along a conveyance route including a terminal station at each end thereof, each of said terminal stations provided with a mobile station position indicating device, means at each of the said stations to produce first recurring timing pulses, means including a receiver and a transmitter at each of said relay stations to retransmit received signals for both at the said terminal stations, a mobile radio station moving along said route, means in said mobile station to produce second recurring timing pulses in synchronism with said first recurring timing pulses, at said mobile station means including an amplifier under control of a first one of said second recurring timing pulses to transmit mobile station identification signals from said mobile station, during a first recurring period of time, to certain of said relay stations in succession according as said mobile station moves along said route, at each of the said certain relay stations means including a pair of gate amplifiers under control of different said first recurring timing pulses and said identification signals to cause mobile station identification signals to be transmitted during said first recurring period from each of the said relay stations and relay station identification signals in different recurring periods from each of the said certain relay stations according to the position of each of the said certain relay stations along said route and means at each of the said terminal stations to receive said identification signals for causing said device to indicate the relative position of said mobile station along said route.

12. A communication system as claimed in claim 11 and in addition there are provided means including suitable circuits to cause signals representative of audible messages to be transmitted between said mobile station and one of said terminal stations during other recurring periods of time.

13. A communication system as claimed in claim 1 and in addition there is a base station at one terminal of said route having a radio transmitter and a signal storage device, a pulse generator associated with said radio transmitter to produce a plurality of sets of timing pulses in synchronism with said series of timing pulses, each of the said sets of timing pulses for a different one of said pulse communication channels, and means associated with said radio transmitter including an operable member to select a certain one of said sets of timing pulses to control said radio transmitter to transmit signals reproduced from said device over a certain one of said pulse communication channels.

14. A communication system as claimed in claim 1 and in addition there is a base station at one terminal of said route having a receiver to receive all of said signals from one of said repeater stations, a wire line extending from said base station, for said line a telephone set having a receiver for the reception of signals and means including a cord circuit to transmit said first signals over said wire line.

15. In a radio communication system, a plurality of numerically designated repeater stations spaced along a predetermined route, a first mobile station comprising a first transmitter and a first receiver in an airplane traveling said route, first means associated with said mobile station to produce a plurality of series of timing pulses, each of the said series of timing pulses for a different pulse communication channel, means associated with said transmitter including a pulse channel selector having an altimeter controlled member to select a first one of said series of timing pulses according to the altitude at which said airplane is flying to thereby select a pulse communication channel for signal transmission, means associated with said receiver responsive to a second one of said series of pulses to receive message signals from a distant station to inform the pilot in said airplane of an obstacle in its flight path by reproduction of said message signals to give the name, height and location of said obstacle, means associated with said first transmitter including a first amplifier responsive to said first selected series of pulses to cause signals to be transmitted over the selected channel to said repeater stations in succession as said airplane moves along said route, means associated with said first transmitter including another pulse channel selector to select a third one of said series of pulses for a third pulse communication channel, a second amplifier responsive to said third series of pulses to cause control signals to be transmitted over said third channel to said repeater stations in succession, a space transmitter associated with each of the said repeater stations to retransmit the said signals received thereat, means at each of the said repeater stations to produce a plurality of trains of timing pulses in synchronism with said series of timing pulses, a different train of said timing pulses for a different repeater station identification pulse communication channel with the identification pulse communication channel for each repeater station designated to correspond to the number of such station, means at each of the said repeater stations including a pulse delay circuit responsive to said control signals to cause said space transmitters to transmit signals over said identification channels in succession as said vehicle moves along said route, means in said mobile station including a scanning device responsive to said signals for visually indicating all of the channels over which signals are being transmitted, and photographic means, associated with said scanning device, coacting with said first means for making a record of the visual indications on said scanning device.

16. A communication system as claimed in claim 11 and in addition there are provided means including suitable circuits to cause signals representative of audible messages to be transmitted between said mobile station and one of said terminal stations during other recurring periods of time, a receiver at said one terminal station to receive all of said signals from one of said repeater stations, a wire line extending from said base station, for said line a telephone set having a receiver for the reception of signals and means including a cord circuit to transmit said message signals over said wire line.

JOHN H. HOMRIGHOUS.

References Cited in the file of this patent

UNITED STATES PATENTS

| Number | Name | Date |
|---|---|---|
| 2,323,534 | Goddard | July 6, 1943 |
| 2,369,783 | Homrighous | Feb. 20, 1945 |
| 2,429,613 | Deloraine et al. | Oct. 28, 1947 |
| 2,437,027 | Homrighous | Mar. 2, 1948 |
| 2,480,123 | Deloraine et al. | Aug. 30, 1949 |
| 2,509,218 | Deloraine | May 30, 1950 |